United States Patent
Branth et al.

(10) Patent No.: US 6,822,958 B1
(45) Date of Patent: Nov. 23, 2004

(54) IMPLEMENTATION OF MULTICAST IN AN ATM SWITCH

(75) Inventors: Kenneth Branth, Santa Clara, CA (US); Jakob Saxtorph, Santa Clara, CA (US)

(73) Assignee: Integrated Device Technology, Inc., Santa Clara, CA (US)

( * ) Notice: Subject to any disclaimer, the term of this patent is extended or adjusted under 35 U.S.C. 154(b) by 691 days.

(21) Appl. No.: 09/669,526

(22) Filed: Sep. 25, 2000

(51) Int. Cl.[7] .............................................. H04L 12/56
(52) U.S. Cl. ................... 370/390; 370/395.31; 370/432
(58) Field of Search ................................ 370/360, 363, 370/389–390, 394–397, 409, 412–419, 428–429, 432

(56) References Cited

U.S. PATENT DOCUMENTS

| | | | |
|---|---|---|---|
| 5,436,893 A | 7/1995 | Barnett | 370/60.1 |
| 5,497,369 A | 3/1996 | Wainwright | 370/60 |
| 5,602,841 A | * 2/1997 | Lebizay et al. | 370/413 |
| 5,608,726 A | * 3/1997 | Virgile | 370/401 |
| 5,825,767 A | * 10/1998 | Mizukoshi et al. | 370/395.7 |
| 5,852,606 A | 12/1998 | Prince et al. | 370/393 |
| 5,898,687 A | 4/1999 | Harriman et al. | 370/390 |
| 5,917,819 A | * 6/1999 | Yang et al. | 370/390 |
| 6,108,335 A | * 8/2000 | Ganmukhi et al. | 370/395.7 |
| 6,144,666 A | * 11/2000 | Chen et al. | 370/395.3 |
| 6,151,301 A | * 11/2000 | Holden | 370/232 |
| 6,246,682 B1 | * 6/2001 | Roy et al. | 370/390 |
| 6,272,134 B1 | * 8/2001 | Bass et al. | 370/390 |
| 6,301,255 B1 | * 10/2001 | Park | 370/399 |
| 2001/0014096 A1 | * 8/2001 | Zhou et al. | 370/395 |
| 2002/0145995 A1 | * 10/2002 | Uriu et al. | 370/351 |

OTHER PUBLICATIONS

IDT SWITCHStAR ™ ATM Cell Based 1.24 Gbps Non-Blocking Integrated Switch Controller Preliminary IDT77V500 Data Sheet.

IDT SWITCHStAR ™ ATM Cell Based 8 X 8 1.24 Gbps Non-Blocking Integrated Switching Memory Preliminary IDT77V400 Data Sheet.

* cited by examiner

*Primary Examiner*—Hassan Kizou
*Assistant Examiner*—Gregory Sefcheck
(74) *Attorney, Agent, or Firm*—Finnegan, Henderson, Farabow, Garrett & Dunner

(57) ABSTRACT

An ATM switch for transmitting a multicast ATM cell includes a memory, a control circuit, and a cell memory. The control circuit maintains in the memory a connection table which includes a multicast master entry and one or more multicast member entries associated with the multicast master entry. The cell memory stores one or more ATM cells, including the multicast ATM cell. The multicast master entry holds an address of the cell memory at which the multicast ATM cell is stored. The multicast member entries are linked to each other through a circular double linked list.

50 Claims, 13 Drawing Sheets

IMPLEMENTATION OF MULTICAST IN AN ATM SWITCH

CROSS-REFERENCE TO RELATED APPLICATION

The present application is related to concurrently filed U.S. patent application Ser. No. 09/670,001, entitled "Detection and Recovery from Connection Failure in an ATM Switch," commonly assigned and having common inventors.

BACKGROUND OF THE INVENTION

1. Field of the Invention

The invention generally relates to a cell switch for use in an asynchronous transfer mode (ATM) network; and in particular, to a cell switch supporting multicast connections and providing connection failure detection and handling in an ATM network.

2. Background of the Invention

Asynchronous transfer mode (ATM) is a cell relay data transmission technique selected as the transport scheme for the B-ISDN (Broadband Integrated Services Digital Network) standard. ATM Communication networks have applications in high speed digital communication carried in such media as synchronous optical networks. An ATM network transmits data of all types (e.g., voice, data, and video) based on asynchronous time division multiplexing. The data are transmitted in the form of fixed-length data packets, called "ATM cells." An ATM cell is 53 bytes long, of which 5 bytes are the cell header and 48 bytes are the cell payload. The cell header carries information used for identification and routing. Traffic within an ATM network is routed through connection nodes within the network where the connection nodes are in turns connected via one or more ATM switches. An ATM switch in an ATM network is primarily responsible for routing the cells to their respective destinations.

An ATM network uses the concepts of "virtual paths" (VP) and "virtual channels" (VC) to allow routing of ATM cells between adjacent connection nodes. Therefore, the cell header of an ATM cell does not specify the full destination address. Rather, the cell header includes, among other things, an 8-bit virtual path identifier (VPI) and a 2-byte virtual channel identifier (VCI) (sometimes referred to as virtual connection identifier), identifying the virtual path and the virtual channel of the cell's next switching stage. The VPI and VCI together identify the connection, called a virtual connection (VC), to which an ATM cell belongs. The cell header of an ATM cell is updated at each switching stage to include the VPI and VCI values of the next switching stage.

Communications in an ATM network can take the form of unicast or multicast. In unicast communication, ATM cells from a sender are transmitted to one recipient only. On the other hand, multicast refers to a "point-to-multipoint connection." In multicast data communication, a sender sends the same ATM cells simultaneously to several recipients within the network. Broadcast is the extreme case of multicast where every user on the network receives the data transmitted by the sender. Recently, there is an increasing demand for multicasting in ATM networks and efficient implementations of multicasting are, therefore, desired.

FIG. 1 illustrates a multicast communication in an ATM network. In FIG. 1, a computer, denoted PC 22, communicates with other computers, PCs 12–16, through an ATM network 10 including ATM switches 24–27. PC 22 intends to send the same data traffic to recipient PCs 12–16. If ATM network 10 does not support multicasting, PC 22 has to replicate the data for each recipient and send the data separately to each of recipient PCs 12–16. This method becomes very inefficient when the number of recipients is large. In ATM network 10 which supports multicasting, PC 22 sends data traffic to multiple recipients (PCs 12–16) without having to transmit the data more than once. ATM switches 24–27 are responsible for directing the data traffic received from PC 22 to all of the intended recipients in network 10.

A conventional implementation of multicasting in an ATM network involves replicating the cells within the network and assigning the correct VPI/VCI values for each cell for routing to the multiple recipients. For example, in ATM network 10, PCs 12–16, belonging to the same multicast group for receiving multicast data traffic from PC 22, are put on a multicast list. ATM network 10 establishes the necessary connections according to the multicast list. When PC 22 sends multicast ATM cells to switch 24, switch 24 replicates the cells and sends the cells to the destination switches according to the multicast list. Here, switch 24 sends replicated multicast ATM cells to switches 25, 26 and 27. Switch 25 in turn replicates the ATM cells and sends the cells to PCs 12 and 13. Similarly, switch 27 replicates and transmits the multicast ATM cells to PCs 15 and 16. Meanwhile, switch 26 transmits the ATM cells to PC 14 without any replication since switch 26 only needs to service one recipient.

A conventional ATM switch used to connect a number of connection nodes within an ATM network is illustrated in FIG. 2. ATM switch 30 includes input ports 31a–c, switching elements 32a–c, and output ports 33a–c. The input ports, the switching elements, and the output ports are interconnected to form switch fabric which enables an ATM cell at any input port to be routed to any specified output port. ATM switch 30 further includes a controller 38 for controlling the operation of the switch, including setting up the input and output ports (through buses 35 and 37) and managing all of the switch traffic moving through switch fabric 34 (through bus 36).

To implement multicasting in ATM switch 30, multicast cells received at any of input ports 31a–c are replicated by switching elements 32a–c and then provided to the respective output ports 33a–c for transmitting to the next switching stage. Thus, switching elements 32a–c must include a sufficiently large memory for storing all of the replicated multicast cells.

Although implementation of multicasting based on cell replication provides flexibility, the implementation has several disadvantages. First, replication requires a large amount of redundant cell memory space in each of the ATM switches to store the replicated cells. The large memory requirement results in a large hardware implementation. Second, besides a large memory requirement, replication requires a large bandwidth to handle the large numbers of replicated cells. Furthermore, the input process could be on-hold until the replication at the output process is completed. In such case, implementation of multicast by replication tends to result in an inefficient use of resources.

To avoid cell replication in multicast connections, an ATM switch can be implemented using a central memory topology as illustrated in FIG. 3. In ATM switch 42 of FIG. 3, ATM cells received on input ports 44a–h are stored in a main cell memory 45. A controller 43 in ATM switch 42 is responsible for commanding the storage of incoming ATM cells and managing the data flow through switch 42. To transmit ATM cells, controller 43 accesses the memory locations where the ATM cells are stored and provides a copy of the cell to a buffer associated with the selected one of output ports 46*a–h*. Controller 43 is also responsible for updating the cell header information for the outgoing ATM cell. Output ports 46*a–h* transmit the ATM cells in their respective buffers together with the updated cell header values.

To establish multicast communications, the output ports desiring to receive multicast communications from a certain input port are put on a multicast list maintained by controller 43. To transmit a multicast cell to a number of output ports 46*a–h*, controller 43 accesses the stored multicast cell multiple times for each output port on the multicast list. Controller 43 modifies the header information (such as VPI/VCI values) of the multicast cell for each destination output port. In this manner, multicasting in an ATM switch employing a central memory topology can be implemented without replication of the multicast ATM cells. However, the above-described implementation of multicasting is often complex and therefore, places severe constraints on the multicasting capability of the ATM switch.

FIG. 4 illustrates another implementation of multicasting in ATM switch 42 of FIG. 3. In this implementation, controller 43 of ATM switch 42 maintains a connection memory 100 containing entries which define the connectivity between the input ports 44*a–h* and the output ports 46*a–h* in switch 42. Essentially, each entry in connection memory 100 defines a particular connection or virtual connection (VC) handled by the ATM switch. In FIG. 4, each entry in connection memory 100 includes a destination VPI (DVPI) field 112, a destination VCI (DVCI) field 114, and an output port number field 116. Each entry in connection memory 100 further includes a head field 117, a tail field 118, and a count field 119, which are used for managing the cell queue for each connection. Controller 43 maintains a cell queue table for each VC in connection memory 100. A cell queue table includes the address locations of all of the ATM cells stored in main cell memory 45 destined for a specific connection. The head field 117 for a VC entry is a pointer pointing to the first item in the cell queue table of that VC entry. The tail field 118 is a pointer pointing to the last item in the cell queue table for that VC entry and the count field 119 contains the number of ATM cells outstanding in the cell queue table.

In connection memory 100, output port number field 116 is used to indicate the output port for the particular VC entry. In the present example, switch 42 has eight output ports and thus output port number field 116 has 8 bits where each bit represents one output port. An output port is selected by a VC entry by setting the associated output port bit to "1" while the remaining bits are set to "0." For example, entry 101 in connection memory 100 is destined for output port 4 since bit 4 of output port number field is set to "1."

To implement multicasting in switch 42, controller 43 allocates one entry in connection memory 100 as a multicast master entry, denoted as entry 102 in FIG. 4. Controller 43 further allocates a consecutive block of memory locations in connection memory 100 for storing virtual connection entries for each multicast member. Because switch 42 has only eight output ports, only eight member entries need to be allocated. In FIG. 4, entries 103 to 110 are the memory locations allocated for up to eight multicast members in the multicast group. In master entry 102, the 8-bit field of output port number field 116 is used to identify the members of the multicast group. For example, in FIG. 4, member entries number 0–4 and 7, corresponding to output ports 0–4 and 7 are identified as belonging to the multicast group of master entry 102. The controller 43 sets up the DVPI field, the DVCI field, and the output port number for each of the member entries 103–110.

When a multicast ATM cell is received, multicast master entry 102 causes the ATM cell to be sent to the member entries identified by output port number field 116. Thus, the same ATM cell is sent to a number of output ports without the need for replication because the same cell stored in main cell memory 45 is sent to the designated output ports in turn. After a multicast cell is transmitted to all of the intended recipient output ports, the cell is removed from the cell queue table of master entry 102 and also from main cell memory 45.

Although the multicast implementation in FIG. 4 achieves efficient cell memory usage by eliminating cell replication, the multicast implementation has several disadvantages. First, the multicast implementation of FIG. 4 limits the number of multicast recipients to one recipient per output port. However, it is often desirable to be able to transmit more than one multicast cell to multiple recipients, destined for different subsequent switching stages, on the same output port. Second, the above described implementation is only capable of supporting a limited number of output ports or multicast members. If the number of multicast members desiring multicasting is large, then the output port number field needs to be expanded and the number of memory allocations for member entries also needs to be expanded. The implementation becomes inefficient when the allocated memory block becomes too large.

Therefore, it is desirable to provide a multicast implementation in an ATM switch which can transmit ATM cells to any number of output ports and to any number of connections at each output port. Furthermore, it is desirable to provide an ATM switch with connection failure detection and recovery scheme such that data transmission in an ATM network is not adversely affected by a malfunctioning output port.

SUMMARY OF THE INVENTION

According to the present invention, an ATM switch for transmitting a multicast ATM cell includes a memory, a control circuit and a cell memory. The control circuit maintains in the memory a connection table which includes a multicast master entry and one or more multicast member entries associated with the multicast master entry. The cell memory stores one or more ATM cells, including the multicast ATM cell. The multicast master entry holds an address of the cell memory at which the multicast ATM cell is stored. The multicast member entries are linked to each other through a circular double linked list.

In one embodiment, the multicast master entry includes a first pointer pointing to the circular double linked list of multicast members entries.

According to another embodiment of the present invention, each of the multicast member entries has a third pointer and a fourth pointer for forming the circular double linked list. Each of the third pointers of the multicast member entries point to the next member entry, thereby connecting the multicast member entries in a forward direction. Each of the fourth pointers of the multicast member entries point to the previous member entry, thereby connecting the multicast member entries in a reverse direction.

Besides being able to support multicasting without the need to replicate multicast cells, the multicast implementation of the present invention permits transmitting multicast connections to more than one multicast recipient per output port. Also, the multicast implementation does not limit the number of multicast member entries for each multicast group and thus can support a multicast group with a large number of members. Lastly, the multicast implementation of the present invention requires fewer logic elements to implement than conventional multicast implementations and allows for flexibility and efficient use of memory space.

The present invention is better understood upon consideration of the detailed description below and the accompanying drawings.

DETAILED DESCRIPTION OF THE PREFERRED EMBODIMENTS

Implementation of Multicast in an ATM Switch

In accordance with the principles of the present invention, an implementation of multicasting in an ATM switch includes a multicast master entry and a circular double linked list of multicast member entries located in a virtual connection memory of the ATM switch. The multicast master entry holds information about the multicast cell queue and is linked to the circular double linked list of multicast member entries, thereby enabling multicasting without the need to replicate the multicast cells. The multicast implementation according to the present invention provides a high degree of flexibility not available in the conventional multicast implementations. In particular, the multicast implementation of the present invention permits transmitting multicast connections to more than one multicast recipient per output port. Furthermore, the present multicast implementation does not limit the number of multicast member entries for each multicast group. In addition, the present multicast implementation also incorporates features of conventional multicast implementations, such as the capability of maintaining multiple multicast groups within one ATM switch. These features and other advantages of the multicast implementation of the present invention will be described in more detail below.

Figure 5:
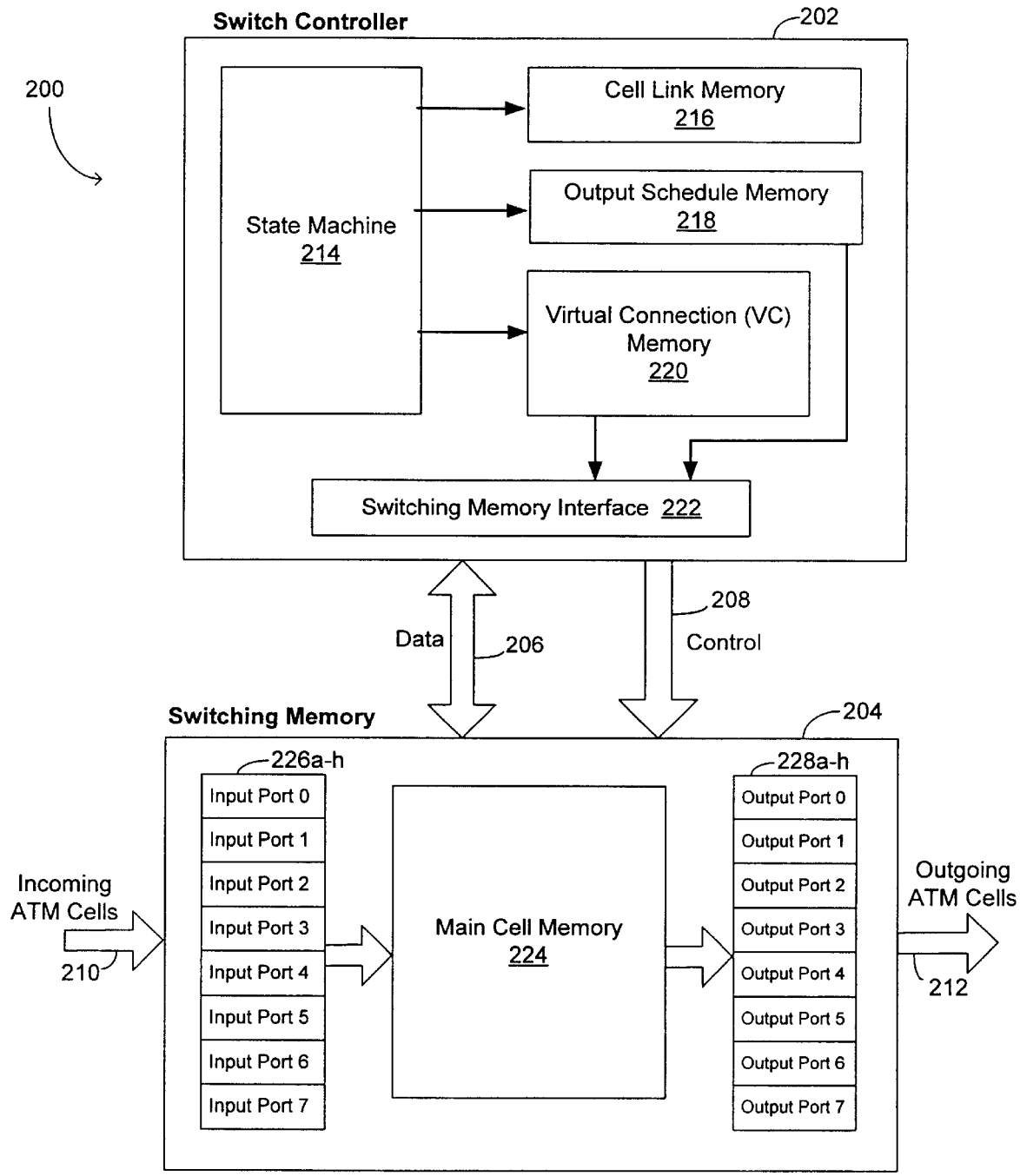
FIG. 5 is a block diagram of an ATM switch according to one embodiment of the present invention.

FIG. 5 is a block diagram of an ATM switch according to one embodiment of the present invention. In FIG. 5, ATM switch 200 includes a switch controller circuit 202 and a switching memory circuit 204. In the present embodiment, ATM switch 200 is constructed using two integrated circuits (or chips). Of course, the two-chip implementation for ATM switch 200 is illustrative only and is not intended to limit the present invention to a two-chip set ATM switch only. One of ordinary skill in the art would appreciate that an ATM switch according to the present invention can be constructed using any number of components, including a single integrated circuit. In the present embodiment, switch controller 202 communicates with switching memory circuit 204 via a data bus 206 and a control signal bus 208. Incoming ATM cells are provided on bus 210 to input ports 226a–h of switching memory circuit 204. Outgoing ATM cells are transmitted on bus 212 from output ports 228a–h of switching memory circuit 204.

In the present embodiment, ATM switch 200 uses a central memory topology for storing and transmitting ATM cells. Switching memory circuit 204 includes a main cell memory 224 having a capacity for storing 8192 ATM cells. The eight input ports 226a–h and the eight output ports 228a–h of switching memory circuit 204 write to and read from main cell memory 224 for storing and accessing ATM cells. However, the central memory topology of switch 200 is illustrative only and the multicast implementation of the present invention is not limited to ATM switches using a central memory topology only. The multicast implementation of the present invention can be applied to all types of ATM switching structures, such as a matrix switching structure or a node-to-node switching structure. The multicast implementation of the present invention is applicable whenever a memory is used in the switching element of an ATM switch to store the ATM cells.

Switch controller 202 manages all of the switch traffic moving through switching memory circuit 204. In operation, switch controller 202 commands the storage of incoming ATM cells received on input ports 226a–h and determines which location in main cell memory 224 to store each ATM cell. Switch controller 202 also interprets and modifies the cell header information as necessary for transmitting the ATM cells through switch 200. For instance, controller 202 performs the connection table look-up function to determine the header values (e.g. VPI and VCI values) for the outgoing ATM cells. Switch controller 202 uses the cell header information to queue and direct individual cells for transmission on the appropriate output port of switching memory circuit 204. When ATM switch 200 of the present invention is incorporated in an ATM network, ATM switch 200 works cooperatively with an external controller of the ATM network to facilitate ATM data communications between ATM endpoints in a conventional manner.

Switch controller 202 in ATM switch 200 includes a virtual connection memory (or VC memory) 220 for storing and keeping track of each virtual connection handled by ATM switch 200. In one embodiment, VC memory 220 has the capacity to store 8192 connections or entries. Of courses, other memory sizes for VC memory 220 can be used. Each entry in VC memory 220 defines the connectivity between input ports 226a–h and output ports 228a–h. Switch controller 202 further includes a cell link memory 216 which holds the cell queue information for each connection stored in VC memory 220. Each connection, or each entry, in VC memory 220 points to an associated cell queue table stored in cell link memory 216. Each cell queue table is a linked list of memory addresses corresponding to the memory locations in main cell memory 224 at which the ATM cells for a particular connection are stored. When multicasting is used, cell link memory 216 includes a cell queue table holding the cell queue information for each multicast group. The operation of cell link memory 216 with VC memory 220 will be described in more detail below. Switch controller 202 further includes an output schedule memory 218 for holding the output queues for each of output ports 228a–h. The output queues in output schedule memory 218 schedule the transmission of outgoing ATM cells on each of output ports 228a–h. In one embodiment, output schedule memory 218 can maintain one output queue for each priority level at each of the output ports. State machine 214 implements the logical functions of switch controller 202 for controlling the operation of VC memory 220, cell link memory 216, and output schedule memory 218. Switch controller 202 communicates with switching memory 204 through switching memory interface 222.

Figure 6:
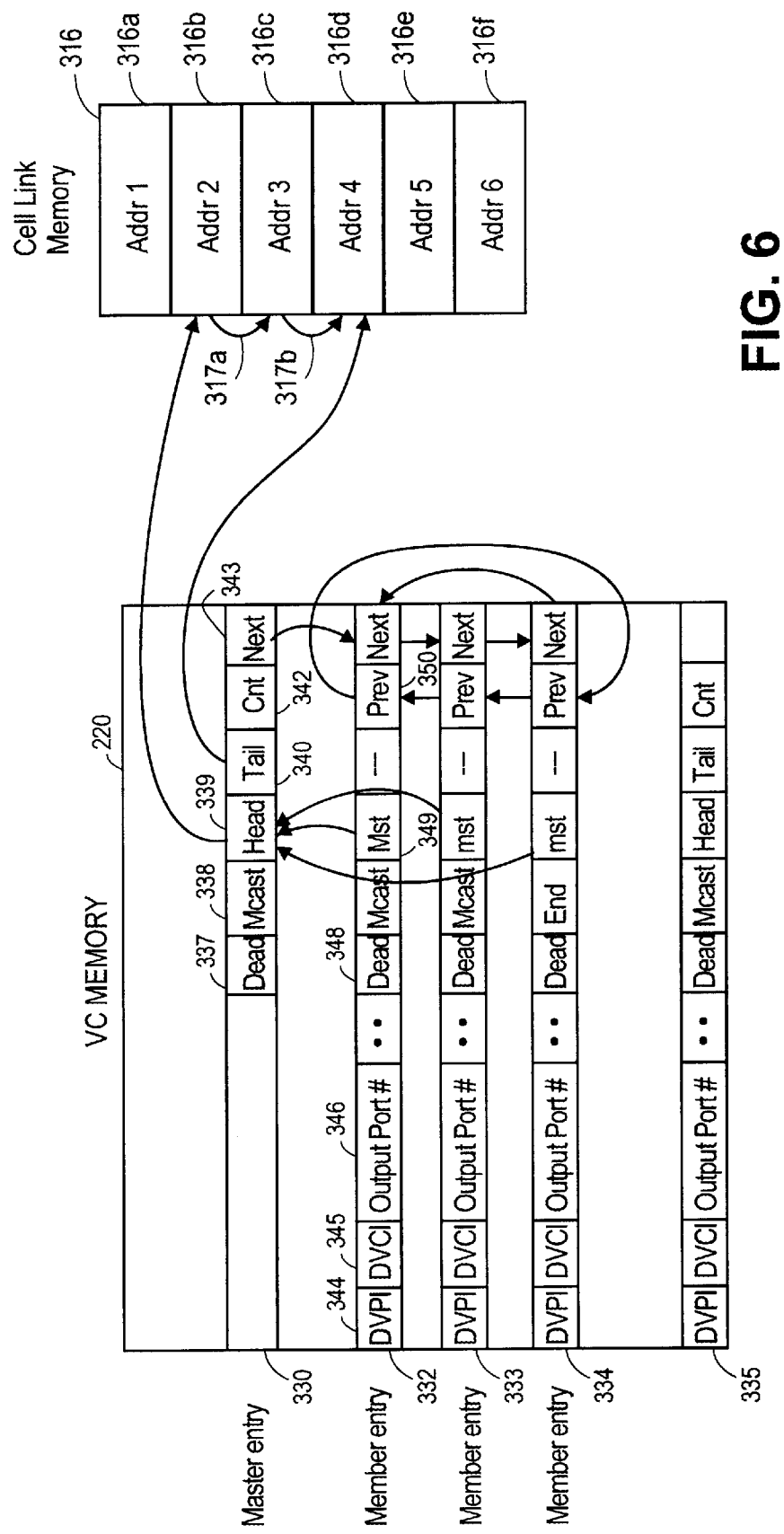
FIG. 6 illustrates an implementation of multicasting in a virtual connection memory of an ATM switch according to one embodiment of the present invention.

ATM switch 200 implements multicasting by generating a circular double linked list of multicast member entries in VC memory 220. One embodiment of VC memory 220 according to the present invention is illustrated in FIG. 6. Virtual connection (VC) memory 220 includes memory locations for storing a number of virtual connection entries. VC memory 220 can have any desirable memory sizes suitable for the operation of the ATM switch. Multicasting in ATM switch 200 is initialized by the external controller of the ATM network. The external controller performs certain set-up and initialization functions including generating in VC memory 220 a multicast master entry and initializing the data fields for the master entry. When a new multicast member is added to the multicast group, the external controller will generate in VC memory 220 a multicast member entry and set up the data fields for the entry. The external controller then executes commands directing switch controller 202 to link the new multicast member entry with the master entry and, when other multicast member entries are already present, to relink the circular double link list of multicast member entries to include the new member entry. When an entry, whether a multicast master or member, is first generated, the data fields contain default values assigned by the external controller. Switch controller 202 is responsible for updating certain data fields in the multicast master entry and in the multicast member entries subsequently added to the multicast group. In FIG. 6, the external controller of the ATM network has generated in VC memory 220 a multicast master entry 330 and multicast member entries 332–334. The data fields of master entry 330 and member entries 332–334 have been updated by switch controller 202.

In the present description, a multicast group refers to all of the recipients in an ATM network who wish to receive the same data traffic. In VC memory 220, a multicast group includes all of the multicast member entries associated with a multicast master entry. Although VC memory 220 of FIG. 6 is illustrated with only one multicast master entry 330, VC memory 220 may include two or more master entries each supporting a different multicast group on the ATM network. The operation of each multicast master entry with the associated multicast group in VC memory 220 is the same. Therefore, the description below concerning the operation of multicast master entry 330 with multicast member entries 332–334 is applicable to other multicast master entries and associated multicast groups in VC memory 220.

Multicast master entry 330 holds the cell queue table for the multicast group, thus eliminating the need to replicate the multicast ATM cells for each multicast member. The cell queue table is a linked list of address locations identifying the storage locations in main cell memory 224 where all of the ATM cells for a multicast group are stored. In ATM switch 200, the cell queue tables for each virtual connection entry are stored in cell link memory 216. Multicast master entry 330 includes a head field 339, a tail field 340, and a count field 342 for managing the cell queue information. Head field 339 is a pointer containing an address associated with a location in cell link memory 216 which stores the memory address of the first multicast ATM cell in the cell queue for that multicast group. Tail field 340 is a pointer containing an address associated with a location in cell link memory 216 which stores the memory address of the last multicast ATM cell in the cell queue for that multicast group. Count field 342 contains the number of cells in the cell queue for the multicast group. In FIG. 6, head field 339 of master entry 330 points to cell address 2 (location 316b) of cell link memory 216. The linking sequence of the cell queue is indicated by arrows 317a and 317b in FIG. 6. Thus, the next two multicast cells on the cell queue for the multicast group are stored in cell address 3 (location 316c in cell link memory 216) and address 4 (location 316d) of main cell memory 224. Tail field 340 points to location 316d indicating that this location is the last multicast cell in the cell queue for the multicast group. New multicast cells are added to the end of the queue and tail field 340 is updated accordingly. In the present embodiment, count field 342 contains a count of 3.

Multicast master entry 330 and multicast member entries 332–334 each includes a multicast field 338 (denoted "Mcast" and "End" in FIG. 6) for identifying the entry type for each connection entries. In the present embodiment, multicast field 338 is a two-bit field and the entry types are given as follows:

| Multicast Field | Connection Memory Entry Type |
| --- | --- |
| 00 | Non-multicast or unicast entry |
| 01 | Multicast master entry |
| 10 | Multicast member entry |
| 11 | End multicast member entry |

When multicast field 338 has a value of "00," the entry is not a multicast entry, but is a unicast entry instead. In this manner, VC memory 220 is capable of supporting unicast communications through switch 200 as well as multicast communications. A multicast field value of "01" identifies a connection entry in VC memory 220 as a master entry. A multicast field value of "10" identifies a connection entry in VC memory 220 as a member entry and a value of "11" identifies the member entry as the end member in the multicast group. In FIG. 6, member entry 334 is the end entry of the multicast group and its multicast field 338 has a value of "11," denoted by the notation "End" in the multicast field 338. Here, the word "End" is used to denote the member at the end of the multicast group and it is intended to distinguish from the "last" member entry as being the only remaining member in the multicast group.

As mentioned above, switch controller 202 of an ATM switch of the present invention maintains in VC memory 220 multiple multicast member entries for each multicast group. One member entry is generated for each multicast recipient. The muiticast member entries 332–334 hold information relating to the connections on which the multicast cells are to be transmitted. Specifically, multicast member entries 332–334 hold information about the virtual connection information (VPI/VCI), the output port number, and other connection parameters for each recipient. In the present embodiment shown in FIG. 6, each member entry (entries 332–334) includes a destination VPI (DVPI) field 344, a destination VCI (DVCI) field 345, and an output port number field 346. Each member entry as well as the master entry may further include other data fields for supporting the operation of the ATM switch.

Figure 1:
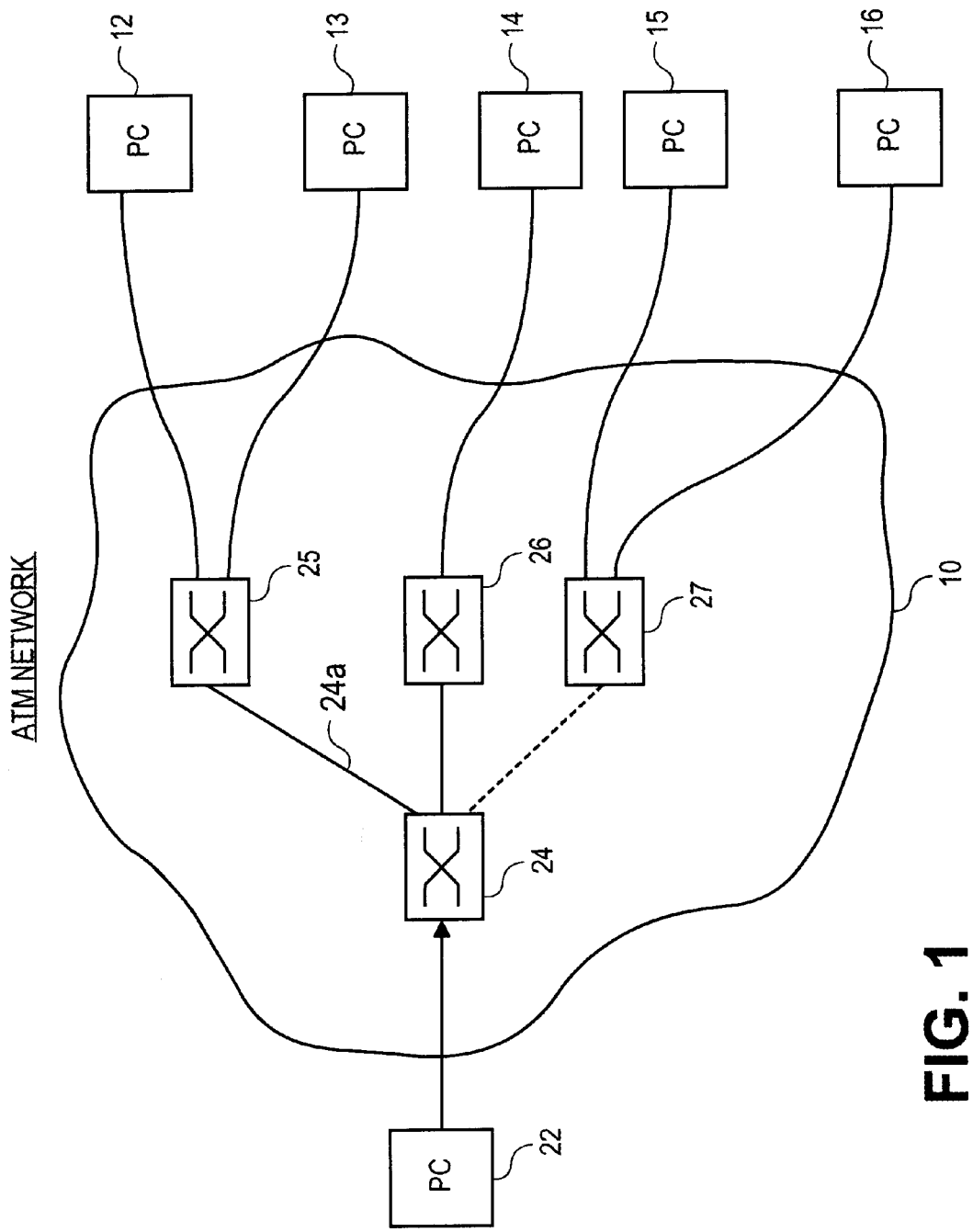
FIG. 1 is a representation of an ATM network.
Figure 2:
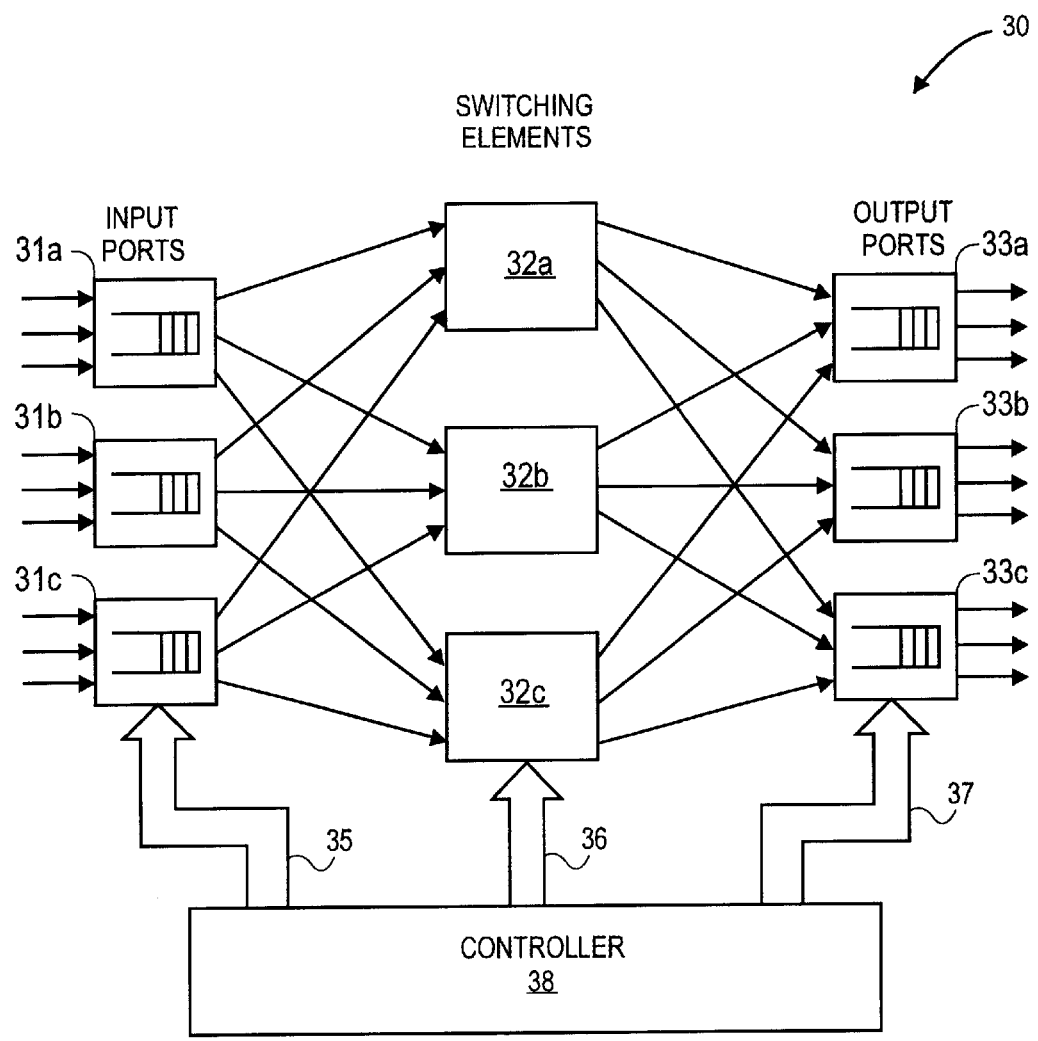
FIG. 2 is a block diagram of a conventional ATM switch.
Figure 3:
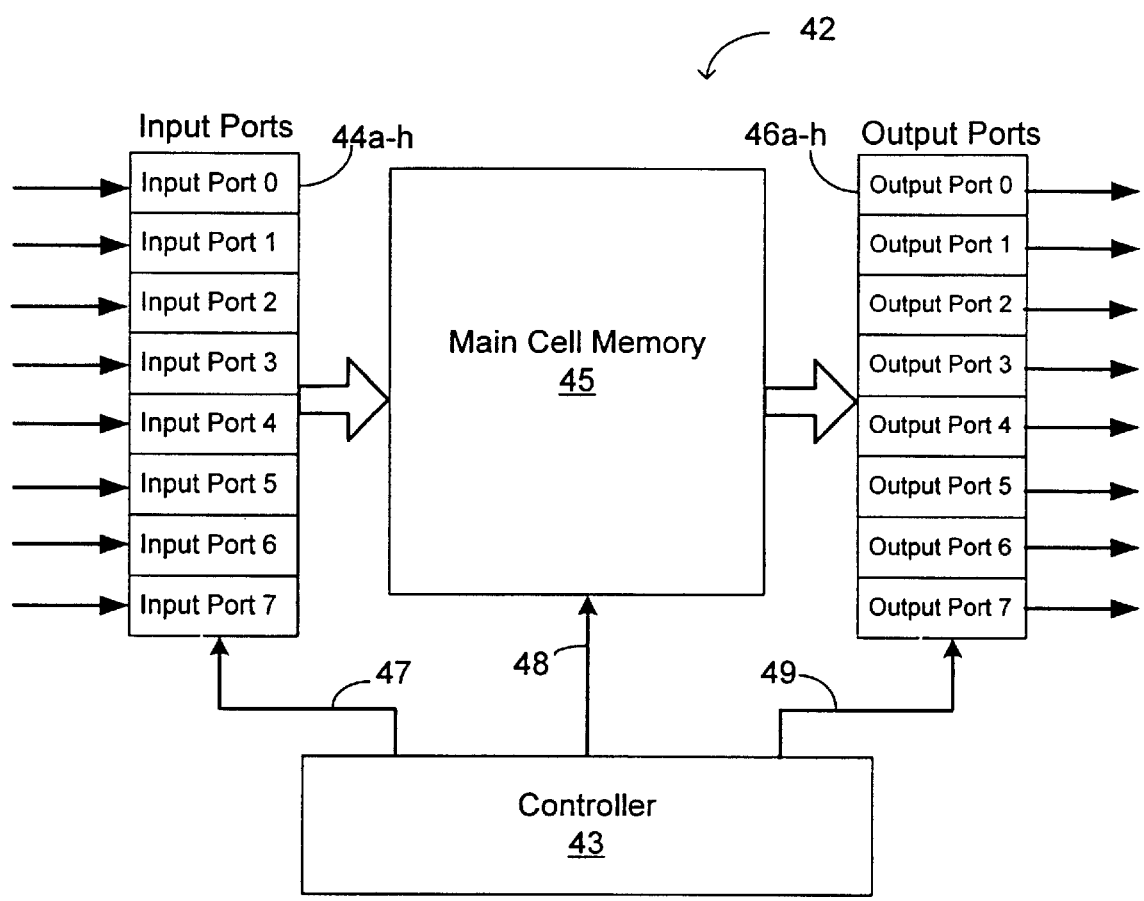
FIG. 3 is a block diagram of an ATM switch implemented using a central memory topology.

ATM switch 200 of the present invention supports multicasting to a "virtual port," i.e., transmitting more than one multicast connection on each of output ports 228a–h. By using "virtual ports," two or more multicast member entries may be designated for the same output port number but each member designating a different connection via the DVPI and the DVCI fields. The multiple virtual connections sent out on the same output port are relayed to their intended destinations by the subsequent switching stages. Multicasting using "virtual ports" is particularly useful when the next switching stage in the ATM network does not support multicasting. For example, referring to FIG. 1, switch 24 sends a multicast cell to switch 25 which has to transmit the cell further on to two output ports (PC 12 and 13). If switch 25 does not support multicasting, multicasting in ATM network 10 can still be carried out as follows. When switch 24 implements multicasting according to the present invention, switch 24 transmits a first multicast connection on output port 24a having a cell header identifying PC 12 as the multicast recipient. Switch. 24 then transmits a second multicast connection also on output port 24a. The second multicast connection has the same payload as the first multicast connection but a different cell header identifying PC 13 as the multicast recipient. Switch 25, upon receipt of the first and second multicast connections, transmits the ATM cells to their respective recipients. By supporting multicasting using "virtual ports," an ATM switch according to the present invention can operate with other switching structures within the network which do not support multicasting. The "virtual port" feature in the multicast implementation of the present invention is of particular importance because the feature facilitates the incorporations of an ATM switch of the present invention with other ATM switches having limited switching capabilities or having no cell storage capability. Furthermore, the ATM switch of the present invention can operate with other devices in the ATM network which are not switches, such as a mux-demux device.

Referring to FIG. 6, the master entry and member entries of a multicast group are associated to each other in VC memory 220 through a next pointer field 343 in multicast master entry 330 and a master field 349 in each of the multicast member entries 332–334. Next pointer field 343 in multicast master entry 330 is a pointer pointing to the circular double linked list of the associated multicast member entries as will be described in more detail below. In operation, next pointer field 343 of master entry 330 holds the address location of the current multicast member in VC memory 220. The "current" multicast member is the multicast group member who is being scheduled by the output process for transmission. On the other hand, master field 349 in each of member entries 332–334 is a pointer pointing to the master entry, that is, master field 349 holds the address location of master entry 330 in VC memory 220. In this manner, a multicast group is defined by next pointer field 343 of master entry 330 and master field 349 of each of member entries 332–334. In FIG. 6, master field 349 of each multicast member entry is depicted as pointing to head field 339 of multicast master entry 330 and next pointer field 343 is depicted as pointing to a next pointer field 351 of multicast member entry 332. Of course, this is illustrative only and in actuality, these fields act as pointers by holding address locations of the respective master or member entries.

Each of member entries 332–334 in VC memory 220 further includes a next pointer field 351 and a previous pointer field 350 for forming the circular double linked list in accordance with the present invention. Next pointer field 351 of a member entry holds the address location of the next member entry, thus pointing to the next member entry. For example, next pointer field 351 of member entry 332 points to next member entry 333. Next pointer field 351 of the end member entry (member entry 334) points back to the first member entry (member entry 332) to form the circular linked list for linking the multicast members in a forward direction.

On the other hand, previous pointer field 350 of a member entry holds the address location of the previous member entry, thus pointing to the previous member entry. For example, previous pointer field 350 of member entry 333 points to previous member entry 332. The first member entry (member entry 332) points back to the end member entry (member entry 334) to form the circular linked list for linking the multicast members in a reverse direction. In this manner, the next pointer field 351 and the previous pointer field 350 of the multicast member entries form the circular double linked list according to one embodiment of the present invention.

Next pointer field 343 of master entry 330 points to the double linked list of multicast member entries by pointing to the current member entry of the multicast group. In FIG. 6, the current member is the first member entry 332. In one embodiment, if no multicast member is present for a multicast group, the next pointer field 343 of multicast master entry is set to the null pointer. In one embodiment, the null pointer has a value of 14'h3FFF. Because each multicast member entry is linked by the circular double linked list, the memory locations for the multicast member entries do not need to be allocated consecutively in VC memory 220. Thus, the multicast implementation according to the present invention allows for flexibility and efficient use of VC memory space.

As mentioned above, VC memory 220 may further include connection entries for unicast connections. A unicast connection entry is illustrated in FIG. 6 as connection entry 335. To identify entry 335 as a unicast connection, multicast field 338 of entry 335 has a value of "00." The head field 339 and tail field 340 of entry 335 point to the respective cell queue for that connection stored in cell link memory 216. The next pointer field 343 in entry 335 is not used and may be used to store other information about the connection. In this manner, unicast connections are transmitted by switch 200 as is conventionally done.

The operation of VC memory 220 in ATM switch 200 will now be described with reference to FIGS. 5 and 6. For each incoming ATM cell received by input ports 226a–226h, switch controller 202 retrieves the connection information from the cell header and performs the connection table look-up function for indexing the incoming cell to one of the connection entries in virtual connection memory 220. After the connection entry is identified, the incoming ATM cell is stored in main cell memory 224 and the address of the memory storage location is put on the cell queue table in cell link memory 216 associated with the cell's connection. When a multicast ATM cell is received, switch controller 202 determines from the VPI/VCI information to which multicast master entry the cell belongs. The ATM cell is stored in memory 224 and the address location of the multicast cell is put onto the end of the cell queue table associated with that multicast master entry. For example, when new multicast cell arrives for master entry 330, the address location in main cell memory 224 where the new cell is stored (e.g. cell address 5) is put on the cell queue table for master entry 330 in cell link memory 216 (e.g. location 316e). Tail pointer field 340 of master entry 330 is updated by storing the newly added address location (location 316e) and the cell queue table is relinked by connecting location 316d (cell address 4) to location 316e (cell address 5).

Turning now to the transmission of multicast ATM cells in ATM switch 200, as mentioned above, switch controller 202 maintains an output queue in output schedule memory 218 for scheduling the transmission of outgoing ATM cells on each of output ports 228a–228h. Since a multicast ATM cell is stored only once, only one multicast member entry from a multicast group will be scheduled for transmission at a time. The output process operates to service each member recipients in a multicast group in a sequential order according to the linked list of next pointer field 351. When the output process of switch controller 202 is ready to transmit a multicast cell for a multicast group, the multicast master entry and the current multicast member entry are read by switch controller 202. For example, when switch controller 202 is ready to transmit an ATM cell for multicast master entry 330, switch controller reads master entry 330 and member entry 332. Member entry 332 is the current member entry since next pointer field 343 of master entry 330 points to member entry 332. From head field 338 of master entry 330, switch controller 202 determines that the ATM cell with cell address 2 in location 316b of cell link memory 216 is the next multicast ATM cell to be transmitted.

Switch controller 202 performs various validation routines before transmitting the multicast cell for the current member entry in a conventionally manner. If switch controller 202 determines that all the validation routines check out, the multicast cell is ready to be transmitted to the connection designated by the member entry 332. The multicast cell in main cell memory 224 is retrieved using the memory address stored in cell link memory 216. The ATM cell is put on the output queue in the selected one of output ports 28a–h. The cell header of the ATM cell is modified according to the connection information (e.g. DVPI, DVCI, output port number) of the current member entry (entry 332). The ATM cell with the new header is then transmitted through one of output ports 228a–h.

After the first member entry is transmitted, controller 202 reads the next member entry in the multicast group using next pointer field 351. The next pointer field 343 of master entry 330 is moved to point to the next member entry 333 in VC memory 220. Member entry 333 becomes the current member entry to be scheduled for transmission on the output queue and the process described above repeats until the ATM cell has been transmitted to all of the member entries in the multicast group.

A multicast ATM cell will be maintained in main cell memory 224 and its address location on the cell queue table in the cell link memory 216 until the multicast ATM cell has been transmitted to all of the members of the multicast group. In operation, when a multicast ATM cell is transmitted to the connection designated by the end member entry, i.e. member entry 334 in VC memory 220, the multicast ATM cell will then be removed from the cell queue table associated with the master entry 330 and the head field 339 will be moved to the next cell in the cell queue table, for example, cell address 3 in location 316c in cell link memory 216. The process described above repeats to transmit the next multicast ATM cell to all of the multicast members (member entries 332–334) in the multicast group.

As mentioned above, in ATM switch 200, multiple multicast connections can be sent out on the same output port, thereby providing a high degree of operational flexibility. Two member entries in a multicast group can be transmitted on the same output port by providing the desired DVPI and DVCI values for each member entry in DVPI field 344 and DVCI field 345 and including the same output port number in output port number field 346. For example, in VC memory 220, member entry 332 and 333 can be two multicast connections directed to the first output port and member entry 334 can be a multicast connection directed to the second output port. Switch controller 202 takes care of modifying the cell header information for each multicast connection. An ATM switch incorporating the multicast implementation of the present invention can operate with other ATM switching structure which does not support multicasting to effectuate efficient multicasting function over the entire ATM network.

Table 1 in Appendix A details the field definition for a unicast entry and a multicast master entry according to one embodiment of the present invention. Table 2 in Appendix B details the field definition for a unicast entry and a multicast member entry according to one embodiment of the present invention. Of course, the field definitions in Table 1 and Table 2 are illustrative only and are not intended to limit the field definitions of a unicast entry, a master entry, and a multicast member entry in the VC memory of the present invention to that disclosed in Tables 1 and 2.

An ATM switch incorporating the multicast implementation according to the present invention achieves advantages not realized by the conventional ATM switches. First, the multicast implementation according to the present invention does not require replication of multicast cells. Thus, the present multicast implementation saves valuable cell memory space and allows for efficient use of cell memory. Second, the multicast implementation of the present invention requires fewer logical elements to implement than the conventional replication implementation, thus saving manufacturing cost.

The present multicast implementation also has the advantage of providing high expandability. Because the number of multicast member entries are not restricted to a fixed number, a multicast group of any number of members can be supported. The number of multicast members for a multicast group is limited only by the size of the virtual connection memory provided in the switch controller. Also, the present multicast implementation can support multiple multicast groups within an ATM switch. Again, the number of multicast groups is only limited by the size of the virtual connection memory provided in the switch controller.

Another important feature of the multicast implementation of the present invention is that, through the use of a circular double linked list, the insertion and removal of multicast members are deterministic. That is, the operation cycles it takes to add or remove a multicast member are known and always the same. Thus, a straightforward and coherent hardware implementation of the ATM switch of the present invention is made possible. The operations for adding and deleting a multicast member from a multicast group in VC memory 220 will now be described in detail.

In ATM switch 200, when a multicast group is initialized, the external controller of the ATM network sets up a multicast master entry in VC member 220 for that multicast group. The external controller is responsible for setting up the data fields of the multicast master entry. When multicast members are added to the multicast group of the master entry, the external controller executes commands to switch controller 202 to link the multicast master entry to the multicast member entries. In the present embodiment, switch controller 202 performs the actual relinking operation. The process of adding multicast members to a multicast group according to one embodiment of the present invention is described with reference to FIGS. 7a–c.

Figure 7A:
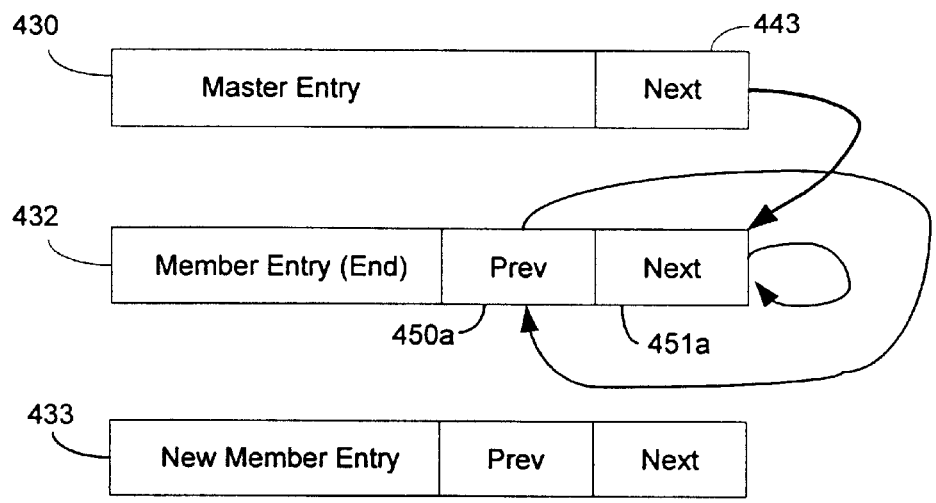
FIGS. 7a–c illustrate the insertion of new multicast members according to one embodiment of the present invention.

FIG. 7a illustrates the result of adding a first member entry 432 to a master entry 430. When the first member entry 432 is to be added to the multicast group, the external controller generates the member entry in VC memory 220 and initializes the data fields of the new member entry. Switch controller 202 then determines whether there is any member entry present in the multicast group by examining the next pointer field 443 of master entry 430. When multicast master entry 430 is first initialized, the master entry is not linked to any member entry and the next pointer field 443 is set to the null pointer value. If master entry 430 has a null pointer value in the next pointer field 443, then switch controller 202 recognizes that member entry 432 is the first entry to be added to the multicast group. Switch controller 202 thus directs next pointer field 443 of master entry 430 to point to new member entry 432. Switch controller 202 also sets the next pointer field 451a and the previous pointer field 450a of member entry 432 to point back to itself (i.e. member entry 432), as illustrated in FIG. 7a. Furthermore, the multicast field (not shown) of the member entry is set to "11" to indicate that this is the only member entry and the "End" member entry of the multicast group. In the present embodiment, the external controller is responsible for setting the value of the multicast field. Of course, in other embodiments, the switch controller can be assigned the responsibility of setting the values of the multicast field of the multicast member entries. With the insertion of the first member entry of the multicast group, the master entry can now be enabled for input processing. When enabled, master entry 430 can start to store multicast cells received for the multicast group.

Figure 7B:
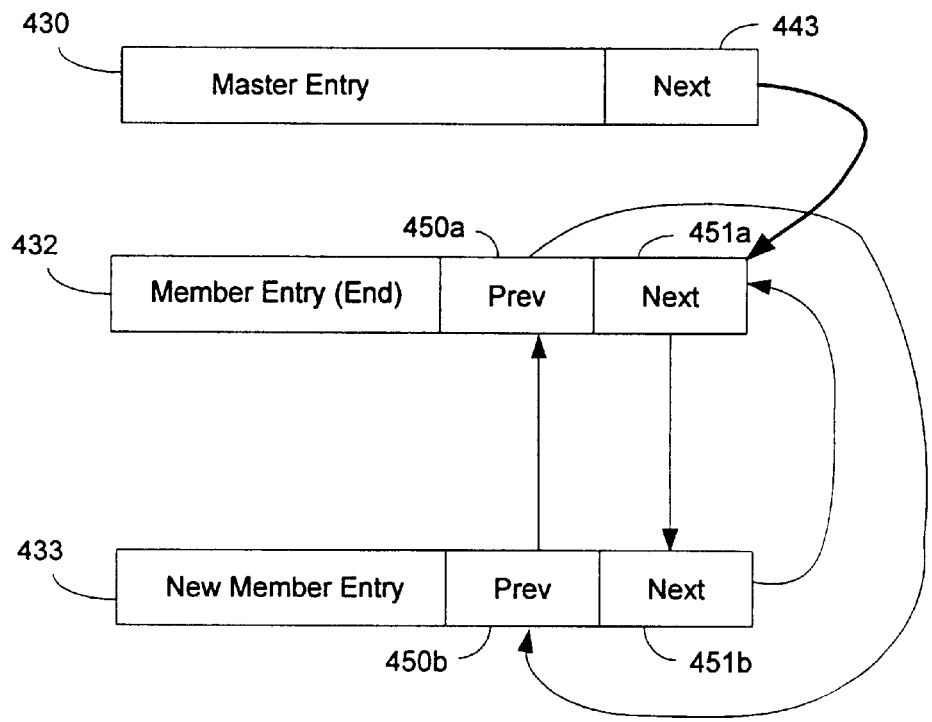

FIGS. 7a and 7b illustrate the process of adding another member to the multicast group of master entry 430. In the present embodiment, when a new multicast member is to be added to the multicast group, the new member is added after the current member entry of the multicast group. The current member entry is the member entry to which next pointer field 443 of master entry 430 points. The current member entry is currently scheduled for transmission on the output queue of the output schedule memory. By adding the new member after the current member entry, the new member will receive the multicast ATM cell being transmitted to the members of the multicast group, thus eliminating any latency between insertion of new members and the receipt of multicast data traffic. In another embodiment, a new multicast member is added before the current member entry of the multicast group. The advantage of adding a new member before the current member entry will be described below with reference to FIGS. 7d and 7e.

In FIG. 7a, new entry 433 is to be added to the multicast group defined by master entry 430. Next pointer 443 of master entry 430 points to member entry 432. Thus, member entry 432 is the current member of the multicast group and new member entry 433 is added after member entry 432. Here, member entry 432 is the first entry in the multicast group. Of course, this is illustrative only and the current member entry can be any member entry currently being scheduled for output process. FIG. 7b illustrates the result of linking new member entry 433 to the multicast group associated with master entry 430.

New member entry 433 is added by pointing next pointer field 451a of member entry 432 to new member entry 433. The next pointer field 451b of new member entry 433 is set to point back to member entry 432 to form a circular linked list in the forward direction. Previous pointer field 450a of member 432, originally pointed to itself, is set to point to new member entry 433. Previous pointer field 450b of new member entry 433 in turn points to member 432, forming a circular linked list in the reverse direction. The multicast field (not shown) of new member entry 433 is set to the value "10" which indicates that it is a multicast member entry (but not the end).

Figure 7C:
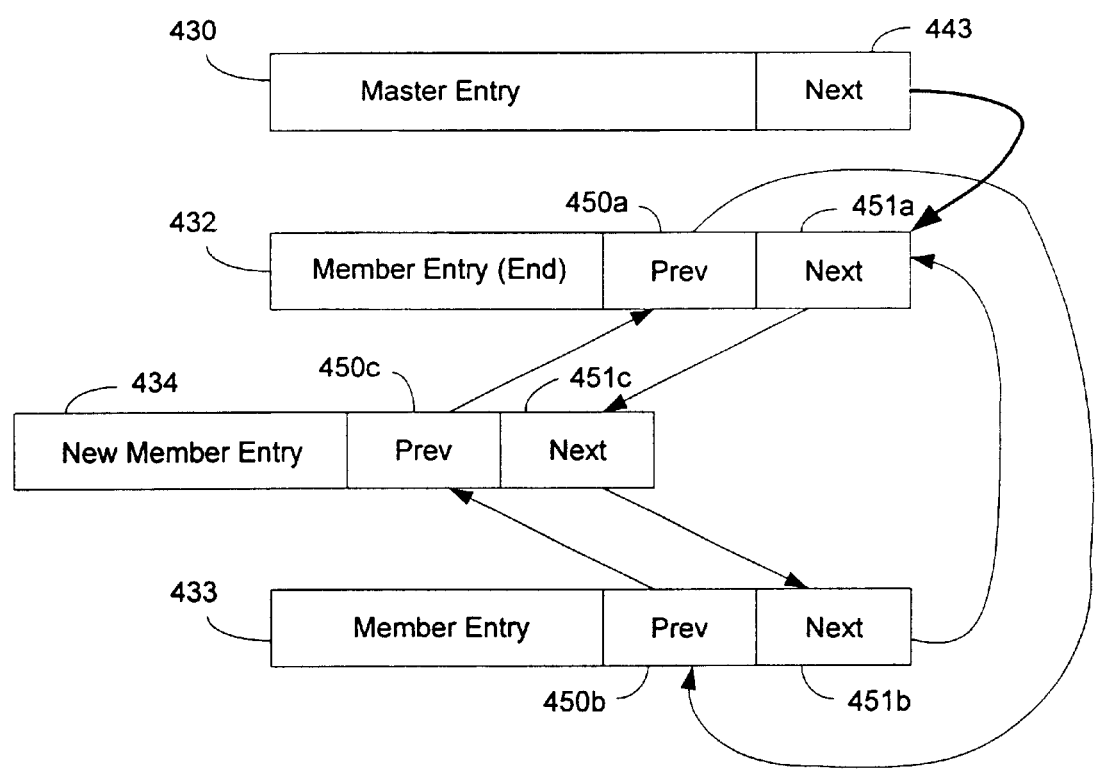

FIG. 7c illustrates the insertion of yet another multicast member to the multicast group of FIG. 7c. New member entry 434 is to be added after the current member entry which, in FIG. 7c, is member entry 432. To add new member entry 434, next pointer field 451a of member entry 432 is set to point to new member entry 434. Next pointer field 451c of new member entry 434 is set in turn to point to end member entry 433. Member entry 433 remains the end entry of the multicast group and its next pointer field 451b remains pointing to member entry 432. The previous pointer fields are relinked by pointing previous pointer field 450c of new member entry 434 to member entry 432, and pointing previous pointer field 450b of member entry 433 to new member entry 434. Previous pointer field 450a of member entry 432 remains unchanged, pointing to member entry 433. The external controller sets the multicast field of new member entry 434 to a value of "10" to indicate that the entry is a multicast member entry (and not the end member entry).

Figure 7D:
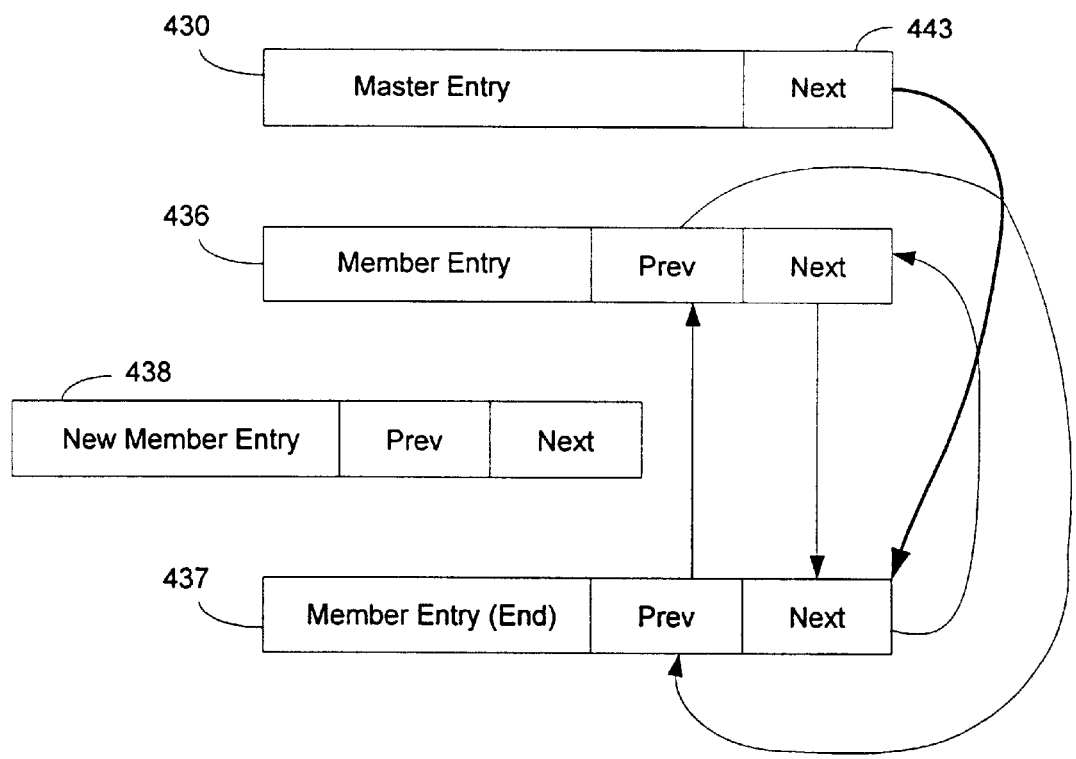
FIGS. 7d–e illustrate the insertion of a new multicast member according to another embodiment of the present invention.
Figure 7E:
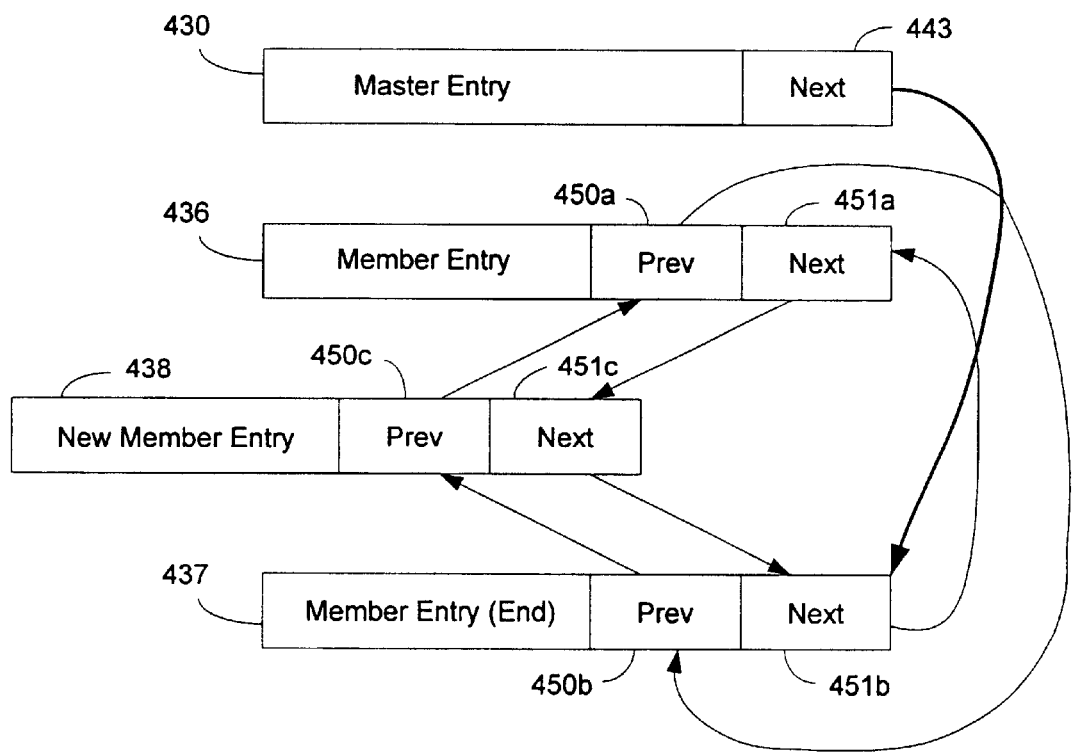

FIGS. 7d and 7e illustrate the process of adding another member to the multicast group of master entry 430 according to another embodiment of the present invention. In FIG. 7d, the multicast group of master entry 430 includes member entries 436 and 437 where member entry 437 is both the end member entry of the group and also the current member since next pointer field 443 points to member entry 437. New member entry 438 is to be added to the multicast group. In the present embodiment, instead of adding a new multicast member after the current member, a new multicast member is added before the current member. The present embodiment provides simplicity in the member insertion process. The process of adding a new member in the present embodiment is similar to that described with respect to FIG. 7c. Referring to FIG. 7e, new member entry 438 is to be added before end member entry 437. Next pointer field 451a of member entry 436 is set to point to new member entry 438. Next pointer field 451c of new member entry 438 is set to point to end member entry 437. Member entry 437 remains the end member of the group and its next pointer field 451b remains unchanged, pointing back to member entry 436. Previous pointer field 450b of member entry 437 is set to point to new member entry 438. Previous pointer field 450c of new member entry 438 is set to point to member entry 436. Previous pointer field 450a of member 436 remains unchanged, pointing to end member entry 437. In this manner, new member entry 438 is added to the multicast group of multicast master entry 430.

Turning now to the removal of a multicast member from a multicast group in the ATM switch of the present invention, when one member entry is to be removed from a multicast group, switch controller 202 indicates in a field in the member entry that the entry is to be removed. Referring to FIG. 6, in one embodiment, each member entry further includes a dead field 348 for indicating whether the member entry is to be removed. Dead field 348 is optional and the ATM switch of the present invention may employ other means for indicating the status of a member entry. In the present description, a member is declared inactive or "dead" when the member is to be removed from the multicast group. In the present embodiment, when switch controller 202 sets dead field 348 for a particular member entry (for example, to the value of "1") to indicate that the member is dead, the switch controller of the ATM switch will remove the member from the multicast group when the output process tries to service the member entry. In Table 2, the dead field is illustrated as VC_mem_dead field. In the present embodiment, the switch controller is responsible for removing "dead" member entries and relinking the circular double linked list of member entries.

According to the present invention, the use of a double linked list allows for efficient removal of multicast members from a multicast group. The latency for removing a multicast member is deterministic. That is, the operation cycles between the time the output process detects that a member is declared "dead" and the time the member is actually taken off the multicast group list is known and always the same. By using a double linked list, a member can be removed and the link list can be relinked by examining the two neighboring connections of the "dead" member entry. There is no need to traverse the entire list of member entries in order to determine how to relink the member linked list. Thus, the delay time to remove a member is constant regardless of the number of member entries in the multicast group. If the removal of a multicast member requires the external controller to traverse the whole list of multicast members before the controller can determine how to relink the connections, the delay time to remove the member will vary depending on the number of members on the list and a cell may get transmitted for a dead multicast member before the member is removed.

Figure 8A:
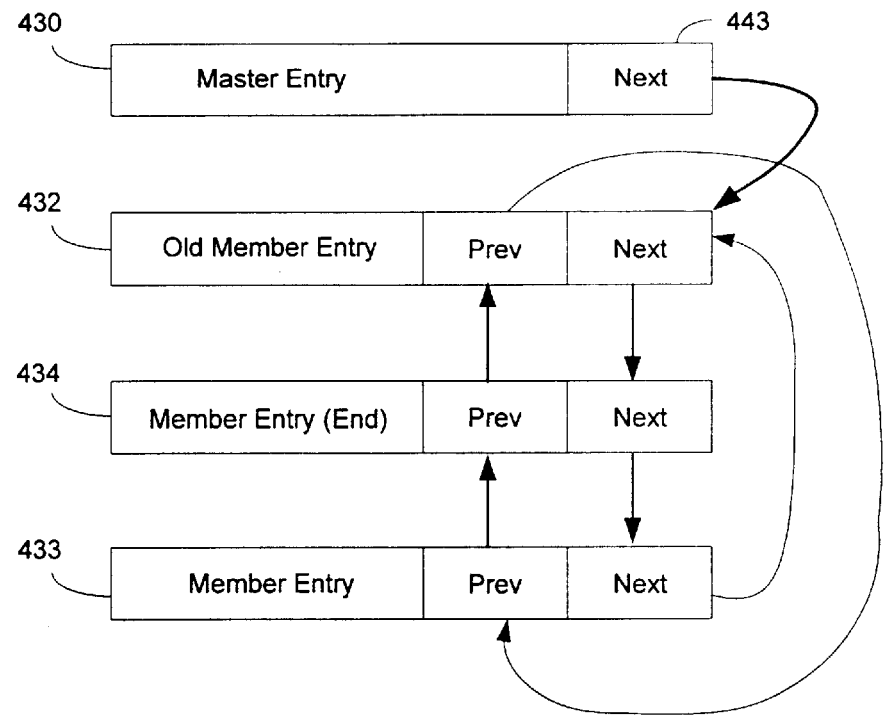
FIGS. 8a–c illustrate the removal of multicast members according to one embodiment of the present invention.
Figure 8B:
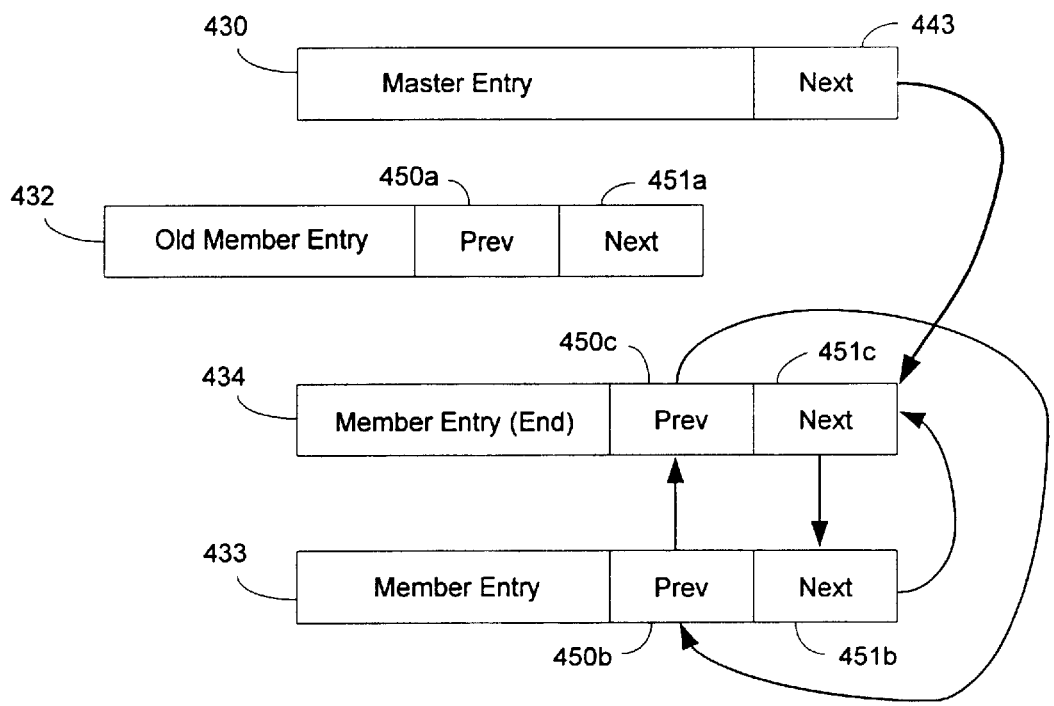

FIGS. 8a and 8b illustrate the process for removing member entry 432 (denoted old member entry) from the multicast group including master entry 430, and member entries 432 to 434. Next pointer field 443 of master entry 430 points to member entry 432, indicating that member entry 432 is the current member entry. As described above, when the output process tries to schedule a member entry for transmission, the switch controller first determines whether the member entry has been declared "dead." In one embodiment, the switch controller examines dead field 348 of the member entry to determine the status of the member entry. In FIG. 8a, dead field 348 of the member entry 432 (not shown) has been set to indicate that it is to be removed from the multicast group. Then, the switch controller proceeds to remove member entry 432 rather than transmitting a multicast cell on the connection. The switch controller also relinks the circular double linked list.

Removing a member entry from a multicast group involves three steps as illustrated in FIG. 8b. First, the next pointer field (451b) of the remaining member entry has to be relinked. This is done by linking the previous member of the old member entry to the next member of the old member entry. Referring to FIG. 8b, next pointer field 451b of member entry 433 (the previous member to member entry 432) is relinked to point to member entry 434 (the next member of member entry 432). Next pointer field 451c of member entry 434 remains unchanged, pointing to member entry 433.

Second, the previous pointer field (450c) of the member entry has to be relinked. This is done by linking the next member of the old member entry to the previous member of the old member entry. Referring to FIG. 8b, previous pointer field 450c of member entry 434 (the next member of old member entry 432) is relinked to point to member entry 433 (the previous member of old member entry 432). Previous pointer field 450b of member entry 433 remains unchanged, pointing to member entry 434.

Third, the next pointer field of the master entry has to be relinked to the next member of the old member entry. In FIG. 8b, next pointer field 443 of master entry 430 now points to member entry 434 which is the next member of old member entry 432. The resulting linking sequence of master entry 430 and member entries 433, 434 is illustrated in FIG. 8b.

In FIG. 8b, the member entry removed is not the end entry of the multicast group. Thus, the status of end member entry 434 as the end member entry is not altered. In the case that the end member entry is removed, the previous member of the end member entry is now the end member and the multicast field of the previous member is correspondingly updated to indicate that it is now the end entry of the multicast group. This process is illustrated in FIG. 8c.

Figure 8C:
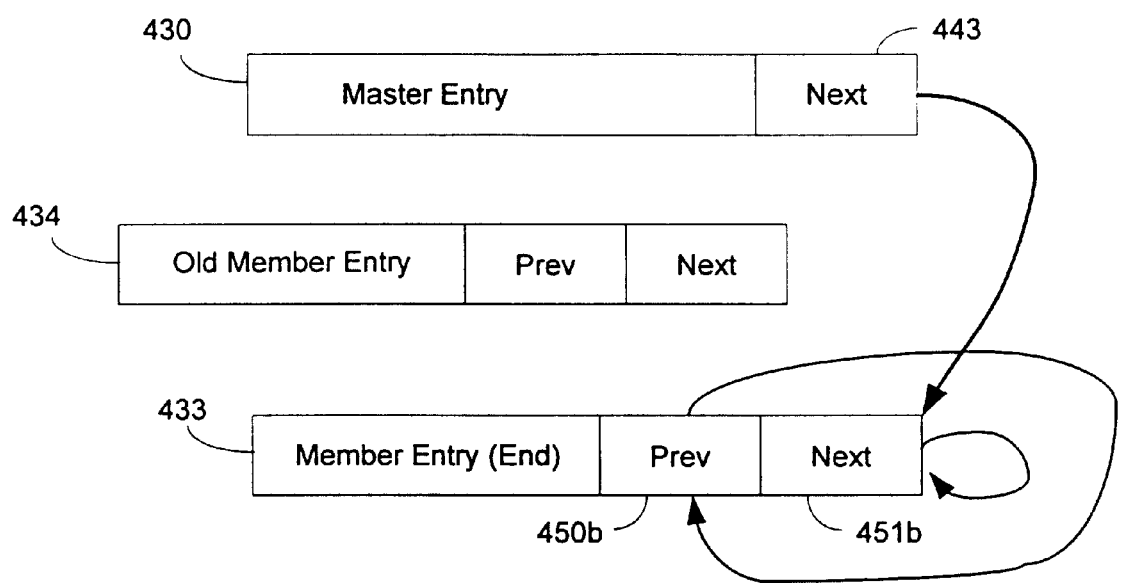

FIG. 8c illustrates the process of removing one more member from the multicast group and also illustrates the situation where removal of a member results in only one member remaining in the multicast group. When end member entry 434 is removed so that only member entry 433 remains, the removal process will cause next pointer field 451b of member entry 433 to point to itself. This is because member entry 433 is both the previous member and the next member of member entry 434. Similarly, previous pointer field 450b points back to itself as illustrated in FIG. 8c. Because member entry 434 is the end entry of the multicast group, removal of end member entry 434 requires updating of the multicast field of the previous member of the removed member to be the new "End" member. In FIG. 8c, the multicast field of the member entry 433 is updated to a value of "11" to indicate that it is now the end entry of the multicast group.

When the end entry in a multicast group is removed, the next pointer field of the master entry is set to the null pointer. In one embodiment, the next pointer field of the master entry has a null pointer value of 14'h3FFF. Switch controller 202 determines that a member entry is the end entry of the multicast group by examining the next pointer field of the member entry. A member entry is the end member in the multicast group when the next pointer field of the member entry points back to itself.

In accordance with the present invention, relinking of the circular double linked list after the removal of a multicast member requires the switch controller to examine only two other member entries, namely, the previous member and the next member of the member to be removed. Thus, no matter how many members there are in the multicast group, the delay time to remove a member is always the same.

Detection and Recovery from Connection Failure in a Multicast Environment

In accordance with another aspect of the present invention, a connection failure detection and recovery scheme is provided. The connection failure detection and recovery scheme of the present invention can be advantageously applied in an ATM switch implementing multicasting according to the present invention as described above to improve the operation efficiency of the ATM switch.

However, the connection failure detection and recovery scheme of the present invention is applicable to any ATM switch for detecting and handling failed connections as long as the relationship between ATM cells received and ATM cells transmitted can be determined.

In an ATM switch, such as ATM switch 200 of FIG. 5, output schedule memory 218 schedules ATM cells stored in main cell memory 224 for transmission on each of output ports 228*a–h*. Occasionally, one of output ports 228*a–h* may fail and no cells can be transmitted on that output port. An output port failure can include hardware failure at the ATM switch, hardware failure of the switching fabric or the connections between the switches, or hardware failure at the input port of the next switching stage. An output port failure can also occur when a multicast member's connection is mis-configured so that the member could not receive any multicast transmission. In another instance, an output port failure can occur when one member is operating at an excessively slow speed, thus preventing other members from being serviced. A failed connection is often referred to as a dead queue condition where the output queue is "stuck" or "dead" and no outgoing ATM cells can be transmitted on the output port. For unicast connections, when one output port has failed, other output ports can still transmit outgoing ATM cells because output schedule memory 218 holds output queue for each individual output port. However, in multicast connections, one failed output port may lead to no multicast cells being transmitted on any of the output ports for any of the members of a multicast group as will be explained below.

In the multicasting implementations described above with reference to FIGS. 5–8, a multicast ATM cell is stored only once in main cell memory 224 and the cell is accessed multiple times for transmission on multiple output ports and/or multiple times on each output port. When a multicast group is scheduled for output, only one member is scheduled for output process at a time. Thus, the current member's connection is put on the output queue for that output port in output schedule memory 218. As each member is serviced by the output process, the next member's connection is put on the output queue for its respective output port for output processing. However, if one output port fails such that the output process is not able to transmit an outgoing multicast ATM cell on that output port, then no other subsequent members in the multicast group can receive the ATM cell even though the other members' connections are on different, functioning output ports. This is because the other members' connections are not put on the output queue for their respective output ports until the previous member is serviced. Thus, in transmitting multicasting connections in ATM switch 200, when one output port fails, no other multicast members in the multicast group can receive any multicast traffic.

Figure 4:
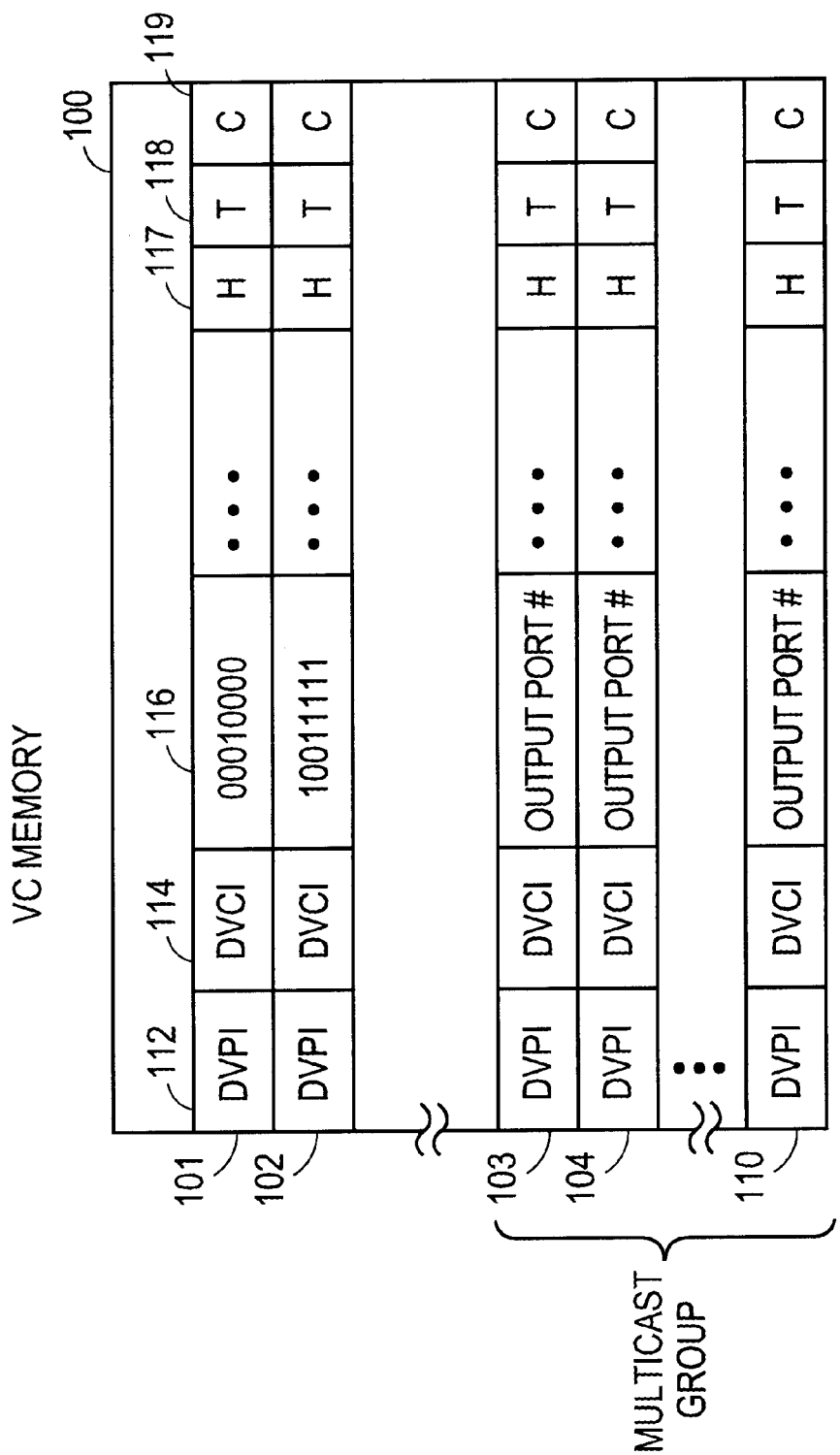
FIG. 4 illustrates one implementation of multicasting in an ATM switch of FIG. 3.

The dead queue situation described above can occur for any multicast implementation using a central memory topology for storing ATM cells. For example, in the multicast implementation described above with reference to FIG. 4, because the output ports selected to receive multicast traffic are serviced in sequence, when one output port fails, the transmission of the multicast cell ceases and the other functioning output ports will not be serviced.

Currently, there is no dead queue handling and recovery scheme available for multicasting in an ATM switch. Thus, when a dead queue condition occurs in an ATM switch transmitting multicast connection, the entire ATM switch becomes dysfunctional even though only one output port has failed. No transmission is possible until the external controller detects the problem and takes the appropriate corrective action.

Figure 9:
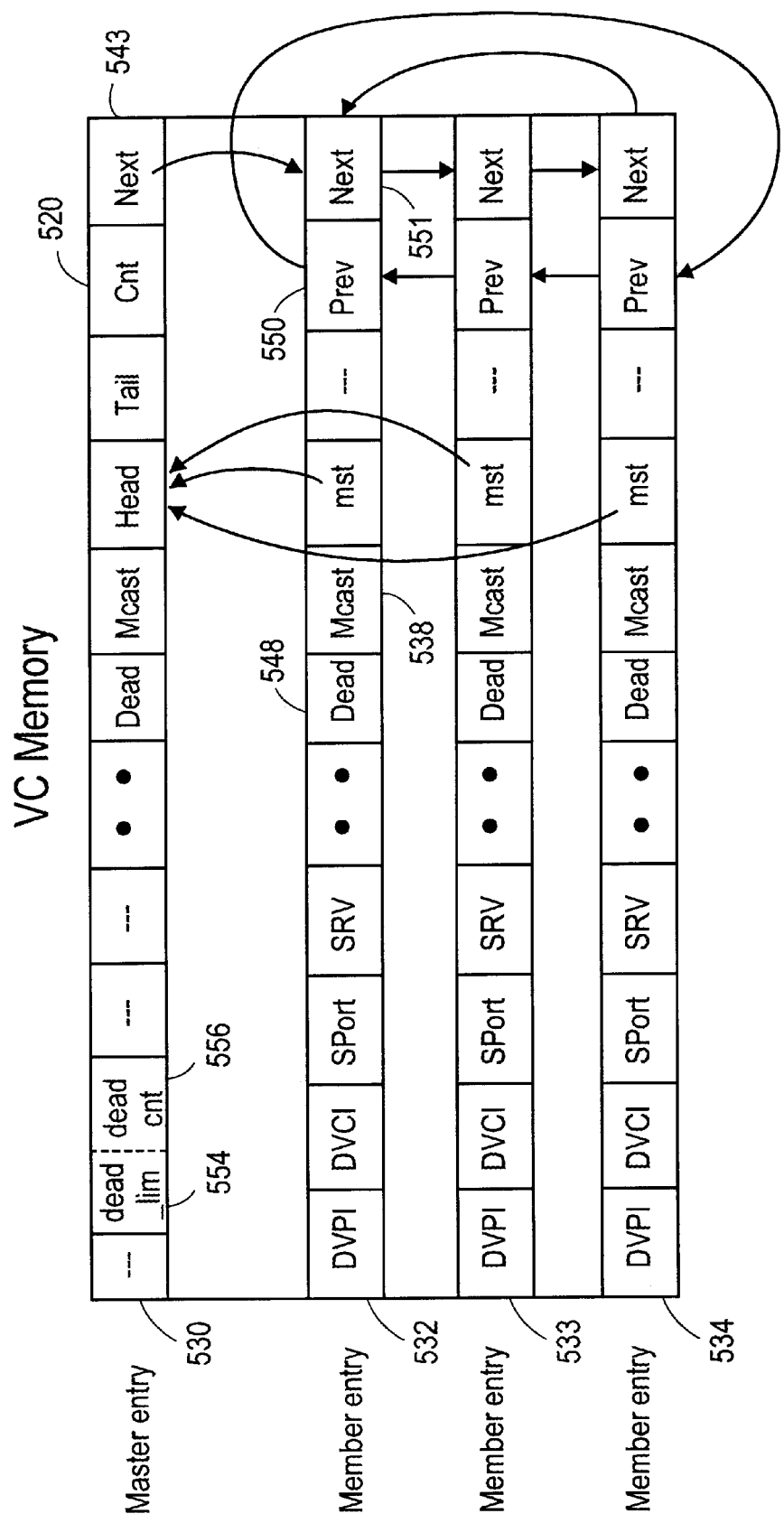
FIG. 9 illustrates an implementation of the connection failure detection and recovery scheme in a connection memory of an ATM switch according to one embodiment of the present invention.

According to one embodiment of the present invention, the connection failure detection and recovery scheme operates by detecting a failed connection based on the number of incoming cells for a multicast group between each transmission of an outgoing cell, and removing the failed connection from the multicast group to allow the output process to service the other multicast group members. FIG. 9 illustrates a virtual connection (VC) memory of an ATM switch incorporating the connection failure detection and recovery scheme in accordance with one embodiment of the present invention. VC memory 520 includes connection entries for a multicast group associated with multicast master entry 530. Multicasting in VC memory 520 is implemented using a circular double linked list according to the present invention described above with reference to FIGS. 5–8. Master entry 530 has a next pointer field 543 pointing to the circular double linked list of member entries 532–534. Multicast member entries 532–534 each includes, among other things, a next pointer field 551 forming a circular linked list in the forward direction, a previous pointer field 550 forming a circular linked list in the reverse direction, and an optional dead field 548 for indicating when the member entry is to be removed from the multicast group.

Referring to FIG. 9, multicast master entry 530 includes a dead count field 556 (denoted "dead_cnt") and a dead limit field 554 (denoted "dead_lim"). Dead count field 556 and dead limit field 554 are used to detect when a dead queue condition has occurred during the transmission of a multicast cell. A dead queue condition is detected by monitoring the number of incoming multicast ATM cells since the last transmission of an ATM cell for a multicast group. If the number of incoming multicast ATM cells is greater than a predefined limit, then the ATM switch assumes that the output process has not serviced or is not able to service the multicast cell queue for a while, and therefore, the output port currently being serviced is assumed to be malfunctioning or "dead." In one embodiment, dead count field 556 in VC memory 520 is incremented by one each time a multicast cell belonging to the multicast group of master entry 530 is received by the ATM switch. Dead count field 556 is set to zero each time the output process transmits a multicast cell for a member entry in the multicast group. Dead limit field 554 contains a predefined value chosen to indicate when the output queue for the multicast group is considered malfunctioning or "dead." Each time a new multicast cell is received for the multicast group and dead count field 556 is incremented by one, the input process of the ATM switch compares dead count field 556 with dead limit field 554. If dead count field 556 is equal to or larger than dead limit field 554, then the multicast member which is currently being scheduled for output will be considered "dead" or "inactive".

According to the present embodiment, a dead queue or failed connection condition arises when the output process has not serviced the multicast queue for a certain period of time. In the present embodiment, the period of time where the output process fails to service the multicast queue is not measured in temporal terms but rather is determined by counting the number of new incoming cells accumulated since the last transmission for the multicast group. Although the rate of incoming cells is not constant, the number of incoming cells accumulated is an adequate measure of the time transpired since the last transmission. If too many new cells are being accumulated before another multicast connection is sent out, then it is assumed that the output process is not able to service the multicast queue and the current connection is not functioning. The value of the dead limit field is selected so that the number of incoming cells does not become excessively large between the transmissions of outgoing cells. In transmitting multicast connections, it is particularly important for the ATM switch to operate at a high transmission rate because for each multicast cell received, the switch needs to send out the same cell to a number of multicast recipients. Thus, an accumulation of a large number of incoming multicast cells can be particularly problematic for multicast operations.

In accordance with another embodiment of the present invention, the connection failure detection and recovery scheme can be disabled by setting dead limit field 554 to zero. In this manner, the ATM switch of the present invention can be compatible for use with other ATM switches not capable of dead queue handling.

When a dead queue condition is detected, that is, when the value of dead count field 556 is equal to or greater than dead limit field 554, the ATM switch determines which member entry the output process is currently servicing and proceeds to remove that member from the multicast group. In VC memory 520, the current member entry is the one to which next pointer field 543 of master entry 530 is pointed. In FIG. 9, member entry 532 is the current member entry being serviced by the output process. When the input process adds a new cell to the multicast cell queue of master entry 530 and the input process determines that a dead queue condition has arisen, the switch controller of the ATM switch will remove the member entry from the multicast group and relink the double linked list using the procedure described above with reference to FIGS. 8a–c. The next member, member entry 533, will then be put on the output queue for servicing. In this manner, a "dead" multicast connection is removed from the multicast group so that transmission to the rest of the multicast members within the group can proceed. The dead count field 556 is set to zero when the current member's connection is determined to be "dead."

If the next multicast connection is a member entry designated to the same output port as member entry 532, then the connection will fail again after dead count field 556 increases up to the limit of dead limit field 554. The process of removing and relinking the member entries will repeat and the next member within the multicast group will be serviced. If the dead queue condition arises when the end member entry, for example, entry 534 in VC memory 520, is being serviced, then the switch controller will remove entry 534 and set the member entry previous to member entry 534 (i.e. member entry 533 in VC memory 520) as the end member entry. As described above, in the present embodiment, an end member entry is indicated by setting multicast field 538 to a value of "11". The switch controller will also cause the ATM cell currently scheduled for output to be removed from the multicast cell queue table of master entry 530. Furthermore, if the dead queue condition arises when there is only one multicast member entry left in the multicast group, the switch controller will remove the last remaining member and will also drop the cell queue for the multicast group. In this manner, the switch controller can recover memory space for use in other operations of the ATM switch. In another embodiment, when the last remaining member is dead and removed, the switch controller can also put the input process of the multicast master entry on hold so that no new ATM cells will be received for the multicast group.

The connection failure detection and recovery scheme of the present invention also provides a reporting scheme to inform the external controller of the ATM network of the malfunctioned connection so that proper corrective action can be taken. According to one embodiment of the present invention, the reporting scheme includes setting an interrupt flag when a dead queue condition has been detected and storing the failed connection number in a register in the ATM switch.

Figure 10:
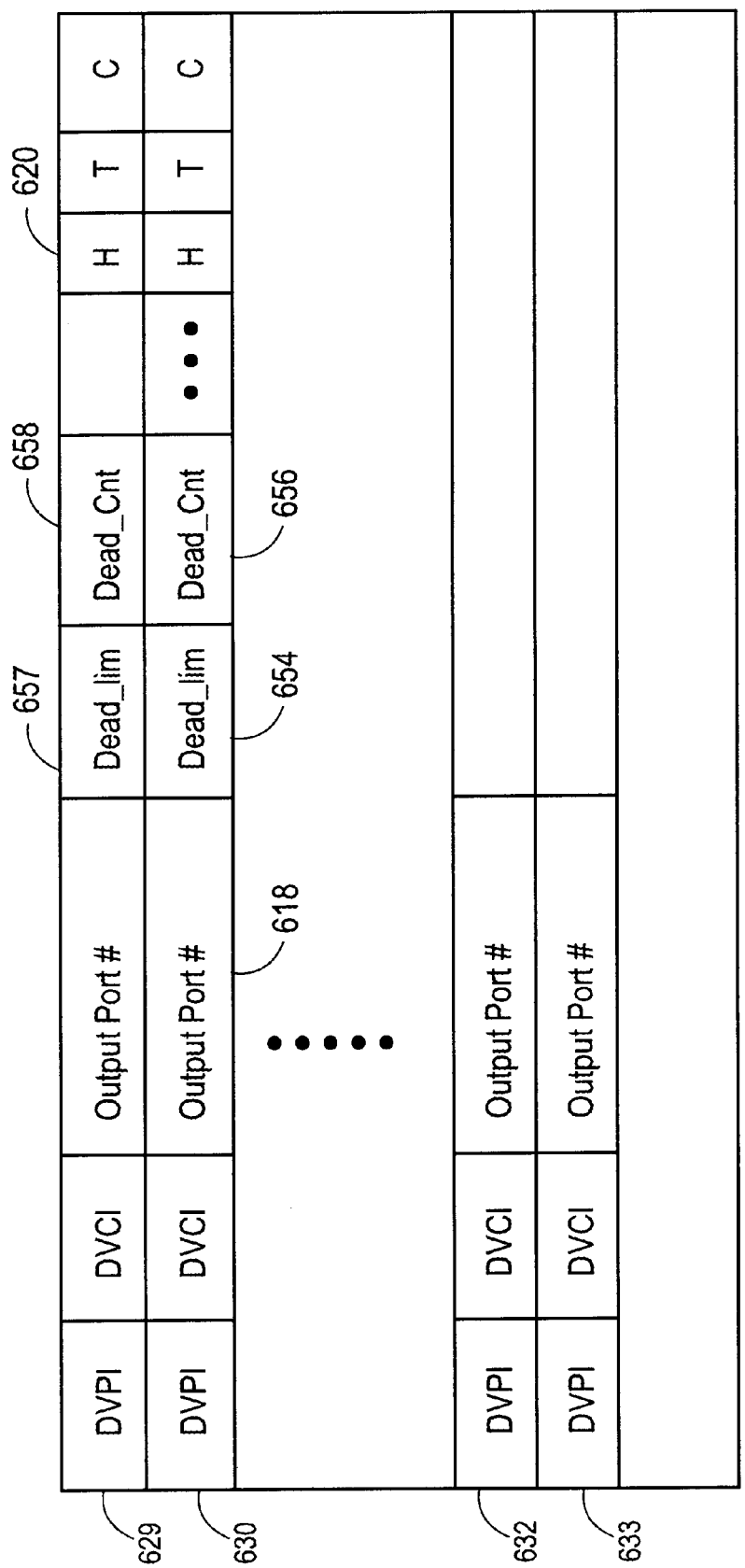
FIG. 10 illustrates an implementation of the connection failure detection and recovery scheme in a connection memory of an ATM switch according to another embodiment of the present invention.

As mentioned above, the connection failure detection and recovery scheme of the present invention can be applied to other multicast implementation as long as the relationship between ATM cells received and ATM cells transmitted can be determined. FIG. 10 illustrates an implementation of the connection failure detection and recovery scheme in the multicast implementation of FIG. 4. In FIG. 10, VC memory 620 includes a multicast master entry 630 having an output port number field 618 mapping to eight allocated locations in VC memory 620 for storing up to eight multicast members entries. Member entries 632 and 633 represent two of the eight member entries. To implement the connection failure detection and recovery scheme of the present invention, multicast master entry 630 includes a dead limit field 654 and a dead count field 656 for keeping track of the number of incoming ATM cells between the transmission of outgoing ATM cells. If the value of dead count field 656 is equal to or greater than dead limit field 654, then a dead queue condition has arisen at the output port currently being serviced. The switch controller then deactivates the member from the multicast group by setting the bit associated with the dead output port in output port number field 618 to "0". The switch controller then proceeds to service the next multicast member who is identified by output port number field 618.

The connection failure detection and recovery scheme of the present invention also has application in a unicast connection for detecting a dead queue condition on an output port and reporting the dead queue condition to the external controller of the ATM network. Referring to FIG. 10, a unicast connection entry 629 is included in VC memory 620. Unicast connection entry 629 includes a dead limit field 657 and a dead count field 658 which operate in the same manner as described above to detect if a dead queue condition has occurred on an output port. When the value of dead count field 658 is equal to or great than dead limit field 657, the switch controller can set an interrupt flag to notify the external controller of the dead queue condition. In the case of a unicast connection, the connection failure detection and recovery scheme of the present invention only operates to detect failed connections. No recovery function is needed for a unicast connection since other unicast connections can proceed on other functioning output ports. In one embodiment, when a failed connection in a unicast communication is detected, the switch controller will, in response, drop the cell queue for that connection. Dropping the cell queue for a failed connection has the advantage of allowing the switch controller to recover memory space allocated for the cell queue for use in other operations. In another embodiment, when a failed connection in a unicast communication is detected, the switch controller will turn off the input process for the failed connection so that no ATM cells will be received for that connection.

An ATM switch incorporating the connection failure detection and recovery scheme of the present invention achieves advantages not realized in a conventional ATM switch. First, the connection failure detection and recovery scheme of the present invention provides a means to detect an excessive transmission delay or a connection failure on an output port, particularly when the output port is handling multicast connections. Second, the ATM switch incorporating the connection failure detection and recovery scheme of the present invention is capable of self-recovery when transmitting multicast connections. The ATM switch can prune dead connections from a multicast group automatically and allow normal multicast connections to proceed on the other functioning output ports. Other multicast members will only experience a minor delay. Lastly, the reporting scheme provides failure reporting using an interrupt flag so that an external controller of the network can repair the failed connection.

The above detailed descriptions are provided to illustrate specific embodiments of the present invention and are not intended to be limiting. Numerous modifications and variations within the scope of the present invention are possible. For example, the switch controller of the ATM switch of the present invention can be provided with varying degree of complexity to allow the switch controller to perform tasks assigned to the external controller of the ATM network, or vice versa. In the above description, the external controller of the ATM network is responsible for generating and initializing the master entries and the member entries in VC memory 220. In another embodiment of the ATM switch of the present invention, the switch controller can be provided with logic circuitry to assume the functions of generating and initializing the master entries and the member entries in the VC memory. Also, in the present embodiment, the task of setting the multicast field of new member entries is performed by the external controller. The switch controller updates the multicast field only when the end member entry is removed from the multicast group and another multicast member entry is assigned to be the end member. Of course, other task assignment configurations between the external controller and the switch controller can be used and the precise task assignment between the external controller and the switch controller is not important to practice of the present invention. Furthermore, besides using a cell queue table, other means for storing and managing ATM cells may be used. The present invention is defined by the appended claims.

TABLE 1

Appendix A
Field Definitions of a Unicast Entry
and a Multicast Master Entry

| Unicast entry | Multicast Master Entry | Definition |
|---|---|---|
| VC_mem_dvpi [11:8] | Not Applicable | In unicast mode, the field holds bits 11 to 8 of the destination VPI. In multicast mode, this field is not used. |
| VC_mem_dvci [15:8] | VC_mem_dead_lim [7:0] | In unicast mode, the field holds bits 15 to 8 of the destination VPI. In multicast mode, the field is an 8 bits dead limit field holding the limit value for detection of dead queues. If this field is set to 0, the dead queue detection scheme is turned off. |
| VC_mem_dvci [7:0] | VC_mem_dead_cnt [7:0] | In unicast mode, the field holds bits 7 to 0 of the destination VCI. In multicast mode, the field is a |

TABLE 1-continued

Appendix A
Field Definitions of a Unicast Entry
and a Multicast Master Entry

| Unicast entry | Multicast Master Entry | Definition |
|---|---|---|
|  |  | dead count field used for detection of dead queues by counting number of cells received between transmission of cells. |
| VC_mem_dead | VC_mem_dead | Dead field to indicate that the multicast group is to be taken down. |
| VC_mem_mcast | VC_mem_mcast | Multicast field to identify the type of entry. |
| VC_mem_head | VC_mem_head | Head of the cell queue |
| VC_mem_tail | VC_mem_tail | Tail of the cell queue |
| VC_mem_ccnt | VC_mem_ccnt | Cell Count of cells on the cell queue |
| Not used | VC_mem_next [13:0] | In unicast mode, this field is bits 13 to 0 of the packet count. In multicast mode, this field is a 14 bit pointer to the current multicast member. |

TABLE 2

Appendix B
Field Definitions of a Unicast Entry
and a Multicast Member Entry

| Unicast entry | Multicast Member entry | Comment |
|---|---|---|
| VC_mem_dvpi | VC_mem_dvpi | Destination VPI |
| VC_mem_dvci | VC_mem_dvci | Destination VCI |
| VC_mem_outport | VC_mem_outport | Output-port number |
| VC_mem_dead | VC_mem_dead | Dead field to indicate that the multicast member is to be removed from the multicast group. |
| VC_mem_mcast | VC_mem_mcast | Multicast field for identifying the types of entry. |
| VC_mem_head [14] | NA | In unicast mode, this field is bit 14 of the cell queue head pointer. In multicast mode, the bit is not used. |
| VC_mem_head [13:0] | VC_mem_mst [13:0] | Used to point to the multicast master entry |
| VC_mem_ccnt [15:14] | NA | In unicast mode, this field is bit 15 to 14 in the cell count field. In multicast mode, these bits are not used. |
| VC_mem_ccnt [13:0] | VC_mem_prev [13:0] | In unicast mode, this field is bits 13 to 0 of the cell count field. In multicast mode, the field is used as the pointer to the previous member. |

TABLE 2-continued

Appendix B
Field Definitions of a Unicast Entry
and a Multicast Member Entry

| Unicast entry | Multicast Member entry | Comment |
| --- | --- | --- |
| Not used | VC_mem_next [13:0] | In unicast mode, this field is bits 13 to 0 of the packet count field. In multicast mode, the field is a pointer to the next member. |

We claim:

1. An ATM switch for transmitting a multicast ATM cell, comprising:

a memory;

a control circuit for maintaining in said memory a connection table, said connection table including a multicast master entry and one or more multicast member entries associated with said multicast master entry, wherein each of said entries includes two data bits indicating whether or not the entry is a multicast master entry or a multicast member entry; and a cell memory for storing one or more ATM cells, including said multicast ATM cell;

wherein said multicast master entry holds an address of said cell memory corresponding to a memory location at which said multicast ATM cell is stored, and said one or more multicast member entries are linked to each other through a circular double linked list.

2. The ATM, switch of claim 1, wherein said connection table includes only one multicast member entry and said circular double linked list links said one multicast member entry to itself.

3. The ATM switch of claim 1, wherein said multicast master entry further includes a first pointer pointing to said circular double linked list of said multicast members entries.

4. The ATM switch of claim 3, wherein each of said multicast member entries has a second pointer, said second pointers of said multicast member entries pointing to said multicast master entry.

5. The ATM switch of claim 3, wherein said first pointer of said multicast master entry points to a current one of said multicast member entries, and a new multicast member entry is added to said connection table after said current one of said multicast member entries by relinking said circular double linked lists.

6. The ATM switch of claim 3, wherein said first pointer of said multicast master entry points to a current one of said multicast member entries, and a new multicast member entry is added to said connection table before said current one of said multicast member entries by relinking said circular double linked list.

7. The ATM switch of claim 3, wherein said first pointer of said multicast master entry points to a current one of said multicast member entries, and said current one of said multicast member entries is removed from said connection table by relinking said circular double linked list.

8. The ATM switch of claim 7, wherein said current one of said multicast member entries being removed is an end member entry and a previous member of said current one of said multicast member entries is made the end member entry.

9. The ATM switch of claim 7, wherein each of said multicast member entries further includes a dead field for indicating an inactive status of each of said multicast member entries, and said current one of said multicast member entries is removed according to a value of said dead field in said current multicast member entry.

10. The ATM switch of claim 1, wherein said multicast master entry and said multicast member entries each include an identification field having a value indicative of the type of entries in said connection table.

11. The ATM switch of claim 10, wherein said identification field has a first value identifying an entry as said multicast master entry, a second value identifying an entry as said multicast member entries, and a third value identifying an entry as an end one of said multicast member entries.

12. The ATM switch of claim 11, wherein said identification field further includes a fourth value identifying an entry as a non-multicast entry which does not receive said multicast ATM cell.

13. The ATM switch of claim 1, wherein each of said multicast member entries includes a third pointer and a fourth pointer, each of said third pointers of said multicast member entries pointing to a next member entry, thereby connecting said multicast member entries in a forward direction, and each of said fourth pointers of said multicast member entries pointing to a previous member entry, thereby connecting said multicast member entries in a reverse direction.

14. The ATM switch of claim 13, wherein said third pointer of an end one of said multicast member entries points to a first one of said multicast member entries, and said fourth pointer of said first one of said multicast member entries points to said end one of said multicast member entries.

15. The ATM switch of claim 1, wherein said multicast ATM cell is capable of being removed from said cell memory after said ATM switch transmits said multicast ATM cell to each of said multicast member entries.

16. The ATM switch of claim 1, wherein each multicast member entry includes a destination connection field identifying a destination connection on which said multicast ATM cell is to be transmitted, and said ATM switch transmits said multicast ATM cell to each of said destination connections identified in said multicast member entries.

17. The ATM switch of claim 1, wherein said cell memory is incorporated in a switching memory, said switching memory comprising:

one or more input ports coupled to said switching memory for receiving said one or more ATM cells; and one or more output ports coupled to said switching memory for transmitting said one or more ATM cells.

18. The ATM switch of claim 17, wherein each of said multicast member entries further includes a destination VPI field and a destination VCI field identifying a destination connection for said multicast ATM cell, and an output port number field identifying which one of said one or more output ports to transmit said multicast ATM cell.

19. The ATM switch of claim 18, wherein said ATM switch is capable of transmitting said multicast ATM cell to each of said destination connections on a respective one of said output ports identified in each of said multicast member entries.

20. The ATM switch of claim 1, wherein said master entry further includes a head pointer and a tail pointer for pointing to a cell queue table, said cell queue table for identifying an address of said cell memory corresponding to a memory location at which said multicast ATM cell is stored.

21. The ATM switch of claim 20, wherein said head pointer points to a first location in said cell queue table identifying a first multicast ATM cell to be transmitted to said multicast member entries, and said tail pointer points to a second location in said cell queue table identifying a last multicast ATM cell to be transmitted to said multicast member entries.

22. The ATM switch of claim 21, wherein said multicast master entry further includes a count field identifying the number of locations in said cell queue table containing multicast ATM cells to be transmitted to said multicast member entries.

23. The ATM switch of claim 1, wherein each of said multicast member entries further includes a dead field for indicating an inactive status of each of said multicast member entries.

24. A method for transmitting a multicast ATM cell, comprising:
storing said multicast ATM cell in a cell memory;
generating a connection table in a memory;
generating a multicast master entry in said connection table, said multicast master entry holding an address of said cell memory corresponding to a memory location at which said multicast ATM cell is stored;
generating one or more multicast member entries associated with said multicast master entry in said connection table; and
connecting multicast member entries to each other through a circular double linked list;
wherein each of said entries includes two data bits indicating whether or not the entry is a multicast master entry or a multicast member entry.

25. The method of claim 24, wherein said connection table includes only one multicast member entry and said circular double linked list links said one multicast member entry to itself.

26. The method of claim 24, further comprising:
connecting a first pointer of said multicast master entry to said circular double linked list of said multicast member entries.

27. The method of claim 26, further comprising:
connecting a second pointer in each of said multicast member entries to said multicast master entry.

28. The method of claim 24, wherein said multicast master entry and said multicast member entries each includes an identification field having a value indicative of the type of entries in said connection table.

29. The method of claim 28, further comprising:
storing in said identification field a first value identifying an entry as said multicast master entry;
storing in said identification field a second value identifying an entry as one of said multicast member entries; and
storing in said identification field a third value identifying an entry as an end one of said multicast member entries.

30. The method of claim 29, further comprising:
storing in said identification field a fourth value identifying an entry as a non-multicast entry which does not receive said multicast ATM cell.

31. The method of claim 24, further comprising:
connecting a third pointer in each of said multicast member entries to a next member entry, thereby connecting said multicast member entries in a forward direction; and
connecting a fourth pointer in each of said multicast member entries to a previous member entry, thereby connecting said multicast member entries in a reverse direction.

32. The method of claim 31, further comprises:
connecting said third pointer of an end one of said multicast member entries to a first one of said multicast member entries; and
connecting said fourth pointer of said first one of said multicast member entries to said end one of said multicast member entries.

33. The method of claim 31, wherein said generating one or more multicast member entries comprises:
determining if said first pointer of said multicast master entry has a null pointer value;
if said first pointer of said multicast master entry has a null pointer value, generating a first multicast member entry in said connection table, comprising:
connecting said first pointer of said multicast master entry to said first multicast member entry;
connecting said third pointer of said first multicast member entry to itself;
connecting said fourth pointer of said first multicast member entry to itself; and
identifying said first multicast member entry as an end multicast member entry.

34. The method of claim 33, wherein said multicast member entries each includes an identification field having a value indicative of the type of entries in said connection table, and said identifying said first multicast member entry as an end multicast member entry comprises:
storing in said identification field a first value identifying an entry as an end multicast member entry.

35. The method of claim 33, wherein said generating one or more multicast member entries further comprises:
if said first pointer of said multicast master entry does not have a null pointer value and said connection memory has only one member entry, generating a second multicast member entry in said connection table, comprising:
connecting said third pointer of said one member entry to said second member entry;
connecting said third pointer of said second member entry to said one member entry;
directing said fourth pointer of said second member entry to said one member entry;
directing said fourth pointer of said one member points to said second member entry; and
identifying said second multicast member entry as an end multicast member entry.

36. The method of claim 31, further comprising:
identifying a current member entry as a multicast member entries to which said first pointer of said multicast master entry points, said current member entry being following by a second member entry;
inserting a new member after said current member entry, said inserting a new member comprising:
connecting said third pointer of said current member entry to said new member entry;
connecting said third pointer of said new member entry to said second member entry;
connecting said fourth pointer of said new member entry to said current member entry; and
connecting said fourth pointer of said second member entry to said new member entry.

37. The method of claim 31, further comprising:
identifying a current member entry as a multicast member entries to which said first pointer of said multicast master entry points, said current member entry being preceded by a second member entry;

inserting a new member before said current member entry, said inserting a new member comprising:
connecting said third pointer of said second member entry to said new member entry;
connecting said third pointer of said new member entry to said current member entry;
connecting said fourth pointer of said new member entry to said second member entry; and
connecting said fourth pointer of said current member entry to said new member entry.

38. The method of claim 31, further comprising:
indicating in a dead field in a first multicast member entry an inactive status, said first multicast member entry being preceding by a second multicast member entry and being followed by a third multicast member entry;
removing said fist multicast member entry from said connection table, said removing comprising:
connecting said third pointer of said second multicast member entry to said third multicast member entry;
connecting said fourth pointer of said third multicast member entry to said second multicast member entry; and
connecting said first pointer of said multicast master entry to said third multicast member entry.

39. The method of claim 24, further comprising:
removing said multicast ATM cell from said cell memory after said multicast ATM cell is transmitted to each of said multicast member entries.

40. The method of claim 24, wherein said generating one or more multicast member entries includes generating in each of said multicast member entries a destination connection field on which said multicast ATM cell is to be transmitted.

41. The method of claim 40, further comprising:
transmitting said multicast ATM cell to each of said destination connections identified in said multicast member entries.

42. The method of claim 24, further comprising:
coupling one or more input ports to a switching memory incorporating said cell memory for receiving one or more ATM cells; and
coupling one or more output ports to said switching memory for transmitting said one or more ATM cells.

43. The method of claim 42, wherein each of said multicast member entries further includes a destination VPI field and a destination VCI field identifying a destination connection for said multicast ATM cell, and an output port number field identifying which one of said one or more output ports to transmit said multicast ATM cell.

44. The method of claim 43, further comprising:
transmitting said multicast ATM cell to each of said destination connections on a respective one of said output ports identified in each of said multicast member entries.

45. The method of claim 24, wherein said master entry further includes a head pointer and a tail pointer for pointing to a cell queue table, said method further comprises:
identifying in said cell queue table an address of said cell memory corresponding to a memory location at which said multicast ATM cell is stored.

46. The method of claim 45, further comprising:
connecting said head pointer to a first location in said cell queue table identifying a first multicast ATM cell to be transmitted to said multicast member entries; and
connecting said tail pointer to a second location in said cell queue table identifying a last multicast ATM cell to be transmitted to said multicast member entries.

47. The method of claim 46, further comprising:
maintaining in a count field in said multicast master entry a value indicative of the number of locations in said cell queue table containing multicast ATM cells to be transmitted to said multicast member entries.

48. The method of claim 24, wherein each of said multicast member entries further includes a dead field for indicating an inactive status of each of said multicast member entries.

49. An ATM switch for transmitting a multicast ATM cell, comprising:
a memory;
a control circuit for maintaining in said memory a connection table, said connection table including a multicast master entry and one or more multicast member entries associated with said multicast master entry, wherein each of said entries includes two data bits indicating whether or not the entry is a multicast master entry or a multicast member entry; and
a cell memory for storing one or more ATM cells, including said multicast ATM cell;
wherein said multicast master entry holds an address of said cell memory corresponding to a memory location at which said multicast ATM cell is stored, and said one or more multicast member entries are linked to each other through a circular double linked list; and
wherein said multicast master entry includes a first pointer pointing to said circular double linked list of said multicast members entries, and each of said multicast member entries includes a second pointer and a third pointer, each of said second pointers of said multicast member entries pointing to a next member entry, thereby connecting said multicast member entries in a forward direction, and each of said third pointers of said multicast member entries pointing to a previous member entry, thereby connecting said multicast member entries in a reverse direction.

50. A method for transmitting a multicast ATM cell, comprising:
storing said multicast ATM cell in a cell memory;
generating a connection table in a memory;
generating a multicast master entry in said connection table, said multicast master entry holding an address of said cell memory corresponding to a memory location at which said multicast ATM cell is stored and including a first pointer;
generating one or more multicast member entries associated with said multicast master entry in said connection table, each of said multicast member entries including a second pointer and a third pointer;
connecting multicast member entries to each other through a circular double linked list;
connecting said first pointer of said multicast master entry to said circular double linked list of said multicast member entries;
connecting each of said second pointers of said multicast member entries to a next member entry, thereby connecting said multicast member entries in a forward direction; and
connecting each of said third pointers of said multicast member entries to a previous member entry, thereby connecting said multicast member entries in a reverse direction;
wherein each of said entries includes two data bits indicating whether or not the entry is a multicast master entry or a multicast member entry.

* * * * *